United States Patent
Lewis et al.

(10) Patent No.: US 8,662,174 B2
(45) Date of Patent: *Mar. 4, 2014

(54) RADIATION-INDUCED THICKENING AND RADIATION-INDUCED TRIGGERING FOR SET-ON-COMMAND SEALANT COMPOSITIONS AND METHODS OF USE

(75) Inventors: Samuel J. Lewis, Duncan, OK (US); Gary Funkhouser, Duncan, OK (US); Anthony Badalamenti, Katy, TX (US); Vikram Rao, Chapel Hill, NC (US); David F. Myers, Cary, NC (US); Vijay Gupta, Morrisville, NC (US); James Lynn Davis, Holly Springs, NC (US); Michael Lamvik, Durham, NC (US); Paul G. Hoertz, Morrisville, NC (US); Lynn Margaret Soby, Apex, NC (US); Andrew K. Dummer, Chapel Hill, NC (US)

(73) Assignee: Halliburton Energy Services, Inc., Houston, TX (US)

( * ) Notice: Subject to any disclaimer, the term of this patent is extended or adjusted under 35 U.S.C. 154(b) by 420 days.

This patent is subject to a terminal disclaimer.

(21) Appl. No.: 13/039,292

(22) Filed: Mar. 2, 2011

(65) Prior Publication Data
US 2011/0272142 A1 Nov. 10, 2011

Related U.S. Application Data

(63) Continuation-in-part of application No. 12/547,440, filed on Aug. 25, 2009, now Pat. No. 8,162,057, and a continuation-in-part of application No. 12/547,442, filed on Aug. 25, 2009, now Pat. No. 8,138,128, and a continuation-in-part of application No. 12/547,443, filed on Aug. 25, 2009, now Pat. No. 8,245,783, and a continuation-in-part of application No. 12/547,447, filed on Aug. 25, 2009, now Pat. No. 8,143,198.

(51) Int. Cl.
*E21B 33/14* (2006.01)
*E21B 33/138* (2006.01)
*C09K 8/42* (2006.01)
*C09K 8/467* (2006.01)

(52) U.S. Cl.
USPC ........... 166/294; 166/247; 166/293; 166/295; 166/300; 507/219; 507/269; 507/271; 507/273

(58) Field of Classification Search
None
See application file for complete search history.

(56) References Cited

U.S. PATENT DOCUMENTS 3,114,419 A * 12/1963 Perry et al. .................... 166/247
3,830,298 A 8/1974 Knight et al.

(Continued)

FOREIGN PATENT DOCUMENTS

WO 2011023939 A1 3/2011

OTHER PUBLICATIONS

International Search Report and Written Opinion for PCT/GB2012/000215 dated Mar. 26, 2013.

*Primary Examiner* — George Suchfield
(74) *Attorney, Agent, or Firm* — Craig W. Roddy; McDermott Will & Emery LLP

(57) ABSTRACT

The present invention includes methods and compositions relating to the setting of fluids or slurries in a wellbore. In one embodiment, a method of isolating a portion a wellbore includes preparing a sealant composition having a fluid component, a polymeric additive constituent, and a set modifier component. The sealant composition is placed into a wellbore and subjected to ionizing radiation. The ionizing radiation can cause bonding between polymeric additive constituents and create a polymer matrix within the sealant composition that increases the mechanical strength of the sealant composition. The ionizing radiation also alters the set modifier component, triggering the thickening of the sealant composition.

55 Claims, 8 Drawing Sheets

(56) References Cited

U.S. PATENT DOCUMENTS

| | | |
|---|---|---|
| 3,872,923 A | 3/1975 | Knight et al. |
| 3,877,522 A | 4/1975 | Knight et al. |
| 4,547,298 A | 10/1985 | Novak |
| 4,768,593 A * | 9/1988 | Novak .......................... 166/295 |
| 5,697,441 A * | 12/1997 | Vercaemer et al. ............ 166/285 |
| 8,162,057 B2 * | 4/2012 | Lewis et al. .................... 166/293 |
| 8,245,783 B2 * | 8/2012 | Lewis et al. .................... 166/293 |
| 8,459,355 B2 * | 6/2013 | Lewis et al. .................... 166/294 |
| 2008/0156231 A1 * | 7/2008 | Boulard et al. ............... 106/640 |
| 2009/0090514 A1 | 4/2009 | Bailey et al. |
| 2011/0048713 A1 | 3/2011 | Lewis et al. |

* cited by examiner

# RADIATION-INDUCED THICKENING AND RADIATION-INDUCED TRIGGERING FOR SET-ON-COMMAND SEALANT COMPOSITIONS AND METHODS OF USE

CROSS-REFERENCE TO RELATED PATENTS

The present application is a Continuation-In-Part to U.S. patent application Ser. Nos. 12/547,440; 12/547,442; 12/547,443; and 12/547,447 each filed on Aug. 25, 2009.

FIELD OF THE INVENTION

The present invention generally relates to hydrocarbon exploration and production operations, such as subterranean cementing operations, and more particularly to compositions and methods that allow for greater control over the thickening and setting of fluids or slurries, such as cement during and after subterranean cementing operations.

BACKGROUND OF THE INVENTION

Natural resources such as oil and gas located in a subterranean formation can be recovered by drilling a wellbore down to the subterranean formation, typically while circulating a drilling fluid in the wellbore. After the wellbore is drilled, a string of pipe, e.g., casing, can be run in the wellbore. The drilling fluid is then usually circulated downwardly through the interior of the pipe and upwardly through the annulus between the exterior of the pipe and the walls of the wellbore, although other methodologies are known in the art.

Fluids and slurries such as hydraulic cement compositions are commonly employed in the drilling, completion and repair of oil and gas wells. For example, hydraulic cement compositions are utilized in primary cementing operations whereby strings of pipe such as casing or liners are cemented into wellbores. In performing primary cementing, a hydraulic cement composition is pumped into the annular space between the walls of a wellbore and the exterior surfaces of a pipe string disposed therein. The cement composition is allowed to set in the annular space, thus forming an annular sheath of hardened substantially impermeable cement. This cement sheath physically supports and positions the pipe string relative to the walls of the wellbore and bonds the exterior surfaces of the pipe string to the walls of the wellbore. The cement sheath prevents the unwanted migration of fluids between zones or formations penetrated by the wellbore. Hydraulic cement compositions are also commonly used to plug lost circulation and other undesirable fluid inflow and outflow zones in wells, to plug cracks and holes in pipe strings cemented therein and to accomplish other required remedial well operations. After the cement is placed within the wellbore a period of time is needed for the cement to cure and obtain enough mechanical strength for drilling operations to resume. This down time is often referred to as "waiting-on-cement", or WOC. If operations are resumed prior to the cement obtaining sufficient mechanical strength, the structural integrity of the cement can be compromised.

Two common pumping methods have been used to place the cement composition in the annulus. The cement composition may be pumped down the inner diameter of the casing and up through the annulus to its desired location. This is referred to as a conventional-circulation direction method. Alternately, the cement composition may be pumped directly down the annulus so as to displace well fluids present in the annulus by pushing them up into the inner diameter of the casing. This is referred to as a reverse-circulation direction method. Cement can also be used within the wellbore in other ways, such as by placing cement within the wellbore at a desired location and lowering a casing string into the cement. The latter method may be used, for example, when there is not the ability to circulate well fluids due to fluid loss into a formation penetrated by the wellbore.

In carrying out primary cementing as well as remedial cementing operations in wellbores, the cement compositions are often subjected to high temperatures, particularly when the cementing is carried out in deep subterranean zones. These high temperatures can shorten the thickening times of the cement compositions, meaning the setting of the cement takes place before the cement is adequately pumped into the annular space. Therefore, the use of set retarding additives in the cement compositions has been required. These additives extend the setting times of the compositions so that adequate pumping time is provided in which to place the cement into the desired location.

While a variety of cement set retarding additives have been developed and utilized, known additives, such as sugars or sugar acids, can produce unpredictable results. Hydroxy carboxylic acids, such as tartaric acid, gluconic acid and glucoheptonic acid are commonly used in oil well cementing as a cement retarder. However, if an excess of hydroxy carboxylic acid is used it can over-retard the set of the cement slurry and thereby causing it to remain fluid for an extended period of time. This over-retardation can result in extended waiting time prior to resuming drilling and may allow gas to invade the slurry thereby causing unwanted gas migration. The extended waiting time results in delays in subsequent drilling or completion activities.

In a number of cementing applications, aqueous salt has been utilized as an additive in cement compositions. The salt, generally sodium chloride, functions as a dispersant in cement slurry, causing the slurry to expand upon setting whereby the attainment of a good bond between the wellbore and casing upon setting of the slurry is enhanced. However, salt saturated slurries can cause problems to bordering formations, and in certain situations salt can be leached out of the cement slurry, which could cause cement failure. Also, certain salts, such as calcium salts, can act as accelerating agents, which reduce the setting time of the cement composition in an attempt to overcome the negative effects of set retarders. However, the presence of a set and strength accelerating agent, such as calcium salt, in the cement composition can increase the risk that the cement composition may thicken or set before placement. Given the complexity of the cement chemistry and the large temperature and pressure gradients present in the wellbore and the difficulty in predicting the exact downhole temperatures during the placement and setting of the cement, it can be difficult to control the retarding additive and accelerating agent to get the desired setting behavior. Systems generally are over-engineered to have very long setting (or thickening) times in order to ensure that the mix remains fluid until all of the cementitious material is in place which can result in excessive WOC.

Therefore, there is a need for improved set control methods and compositions, which bring about predictable cement composition setting times as well as fluid and slurry thickening times in the subterranean environments encountered in wells. In particular, it is desirable to develop methods for rapidly thickening and setting of such fluids, such as cement-based systems, whereby the timing of the fluid thickening and setting is under the control of engineers in the field without the risk of premature setting. Thus, a need exists for compositions and methods of using such compositions for cementing a wellbore that would simultaneously contain sufficient retarder material to ensure proper pumpability for the desired pumping duration and a sufficient concentration of an accelerator to shorten the setting time, whereby the thickening effect of the accelerator is under the control of technicians in the field.

SUMMARY OF THE INVENTION

The present invention generally relates to wellbore fluid and/or slurry compositions and methods of using such compositions that allow for greater control over the setting of such compositions in a wellbore.

Disclosed herein is a sealant composition having a wellbore treatment fluid component, a polymeric additive component, and a set modifier component. The polymeric additive can be a monomer, prepolymer, homopolymer, copolymer, terpolymer, hyperbranched, dendritic polymer, a water-soluble crosslinkable polymer, a comb polymer, and combinations thereof, that crosslink when exposed to the ionizing radiation. Also disclosed herein is a method of isolating a portion of a wellbore by preparing such a sealant composition, placing the sealant composition into a wellbore, and subjecting the sealant composition to ionizing radiation. The ionizing radiation can cause bonding between polymeric additive constituents and creates a polymer matrix within the sealant composition that increases the mechanical strength of the sealant composition. The ionizing radiation can cause the destruction or degradation of at least a portion of the polymeric additive molecules, resulting in an increase in the mechanical strength of the sealant composition. Ionizing radiation can also alter the set modifier, resulting in an increase in the mechanical strength of the sealant composition.

The sealant composition can contain chemical retarders used to inhibit sealant composition setting and the ionizing radiation can cause the destruction of at least a portion of the chemical retarders, thereby reducing fluidity in the sealant composition and increasing the mechanical strength of the sealant composition. The sealant composition can include one or more components selected from the group consisting of sealants, resins, cements, settable drilling muds, conformance fluids, and combinations thereof. The sealant composition can further include at least one scintillator material capable of emitting secondary ionizing radiation, or non-ionizing radiation, upon exposure to the ionizing radiation.

The polymeric additive can be a monomer, prepolymer, homopolymer, copolymer, terpolymer, hyperbranched or dendritic polymer. In embodiments the polymeric additive can be selected from a poly(alkyleneoxide), poly(vinyl pyrrolidone), poly(vinyl alcohol), a polyacrylamide, a polyacrylate, poly(vinyl methyl ether), and combinations thereof. In embodiments the polymeric additive can be a water-soluble crosslinkable polymer, or a comb polymer.

The slurry can further include bridging agents capable of reacting with the polymeric additive. The bridging agents can be selected from the group including ethylene glycol, propylene glycol, diethylene glycol, poly vinyl pyrrolidone, poly vinyl alcohol, poly vinyl methyl ether, poly acryl amide, polyols (alcohols containing multiple hydroxyl functional groups), polyacrylates and combinations thereof. The slurry can further include at least one scintillator material capable of emitting secondary ionizing radiation, or non-ionizing radiation, upon exposure to the ionizing radiation.

The set modifier can include one or more components selected from an accelerator, an oxidizing agent, a set retarder, or combinations thereof, and can include a polymeric component. The polymeric component can form an encapsulating layer over particles of the set modifier. The polymeric component can be mixed with the set modifier so the polymeric component acts as a binder and the resulting mixture can then be formed into a pellet. The polymeric component can form an encapsulating layer over the pellet.

The polymeric component can have a radiation tolerance of from about 1 Gray to about 500 KiloGrays and can be selected from the group consisting of: polyisobutylene, fluoroelastomers, silicon rubber, polyesters, polytetrafluoroethylene, polyacetals, polypropylene, copolymers of polypropylene-ethylene, polymethylpentene, polymethylmethacrylate, fluorinated ethylene propylene, cellulose acetate, polymethylacrylonitrile, polyhexylsulfone, cellulose acetate butyrate, and combinations thereof.

In an embodiment the polymeric component can have a radiation tolerance of less than about 500 KiloGrays and can be selected from the group consisting of: copolymers of methyl-methacrylate (MMA) with a α-substituted chloro or cyano acrylates; MMA based polymers with incorporation of fluorine into the methacrylates; polymers having a C—S bond, such as poly(butene-1-sulfone); polymers having a Photosensitive Acid Generator group (PAG) in the polymer structure; polycarbonates such as poly-bisphenyl-A and bisphenyl-C carbonates; polyamides, such as nylon; water-insoluble cellulose-based polymers, such as Colloidon (nitrocellulose), cellulose acetate and cellulose xanthate; and combinations thereof. Optionally the polymeric component can have a radiation tolerance of less than about 100 KiloGrays, optionally less than about 10 KiloGrays, optionally less than about 1 KiloGrays, optionally less than about 100 Grays, optionally less than about 50 Grays, optionally less than about 10 Grays, optionally less than about 5 Grays.

In an alternate embodiment the sealant composition can contain photocatalytic particles such as $TiO_2$, doped $TiO_2$, or composites that can enhance the degradation of the polymers when exposed to ionizing radiation. The photocatalytic particles can be nanoparticles.

The set modifier can include an accelerator in an amount of from about 0.1% to about 20% by weight of the sealant composition. Subjecting the sealant composition to the ionizing radiation can enable the accelerator to react with compounds within the sealant composition to increase the mechanical strength of the sealant composition.

The set modifier can also include an oxidizing agent in an amount of about 0.05% to about 5% by weight of the sealant composition capable of attacking any set retarder present. Subjecting the sealant composition to the ionizing radiation can enable the release of the oxidizing agent which reduces the retarding capability of the retarder, allowing set.

The set modifier can include a set retarder in an amount from about 0.1% to about 10% by weight of the sealant composition. The set modifier can be a sensitized retarder, and can be a boronated compound. The ionizing radiation can be sufficient to degrade the set retarder, thus reducing the retarding effect.

The composition can further include at least one sensitizer material to increase the sealant composition capture efficiency of the ionizing radiation. The sensitizer material can be a boron compound. The sealant composition can further include at least one scintillator material capable of emitting secondary radiation upon exposure to the ionizing radiation. The sensitizer material can also be a scintillator material.

The slurry can also contain chemical retarders used to inhibit slurry setting and the ionizing radiation can cause the destruction of at least a portion of the chemical retarders, thereby reducing fluidity in the cement phase and enhancing the increase in mechanical strength of the slurry.

The ionizing radiation can be selected from the group consisting of alpha rays, beta rays, gamma rays, neutron rays, proton rays, UV rays and X-rays. The ionizing radiation can be emitted from a high-flux neutron source that can be selected from the group consisting of plutonium-beryllium, americium-beryllium, and americium-lithium. The high flux neutron source can be an accelerator based neutron generator. Neutron radiation can be referred to as ionization inducing or indirectly ionizing.

A radiation emitter can be lowered into the wellbore and the ionizing radiation can be emitted from a radiation emitter that is subject to the control of technicians. Two or more radiation emitters can optionally be separately lowered to two or more depths of the wellbore, such that the two or more depths of the wellbore can be subject to ionizing radiation simultaneously.

Embodiments of the present invention also generally relate to wellbore cementing methods that allow for greater control over the setting of cement and thickening of slurry in a wellbore.

An embodiment of the invention is a method of cementing a wellbore that includes preparing a cement composition including hydraulic cement and sufficient water to form a slurry, adding a polymeric additive and a set modifier to the composition, placing the cement composition into the wellbore and subjecting the placed cement to the ionizing radiation. Another embodiment of the invention is the same cement composition including a hydraulic cement and sufficient water to form a slurry, a polymeric additive, and a set modifier. An aspect of these embodiments is that ionizing radiation can induce crosslinking polymerization of at least a portion of the polymeric additive constituents and can create crosslinks between the polymer chains, thus creating a polymer matrix anchored to two or more particles to increase the mechanical strength of the composite, sufficient to enable resumption of activities such as continued drilling or completion procedures. The ionizing radiation can include neutron radiation, which can be referred to as ionization inducing or indirectly ionizing.

The polymeric additive can be a monomer, prepolymer, or polymer. In an embodiment at least a portion of the polymeric additive contains at least one functional group that can bond to the surface of the cement particles and at least a portion of the polymeric additive contains at least one functional group that is water-soluble and can form crosslinks when exposed to the ionizing radiation.

The ionizing radiation can also cause the destruction of at least a portion of a polymeric component, resulting in an increase in the mechanical strength of the slurry. The ionizing radiation can also act to release or activate one or more set modifier, such as an accelerator. The accelerator can be combined with a polymeric component, such as mixed wherein the polymeric component acts as a binder and the resulting mixture is then formed into a pellet. The ionizing radiation can cause the degradation of the polymeric component and facilitate the release of the accelerator. The accelerator can be added in an amount of from about 0.1% to about 20% by weight of cement. The polymeric component can have an ionizing radiation tolerance of less than about 500 KiloGrays. In an optional embodiment, the amount of ionizing radiation required to degrade a polymeric component is between about 1 Gray to about 500 KiloGray, optionally between about 1 Gray to about 100 KiloGray, optionally between about 20 Gray to about 40 KiloGray. The ionizing radiation can be emitted from a high-flux neutron source.

In an embodiment at least a portion of the polymeric additive can have at least one functional group that can bond to the surface of the cement particles and at least a portion of the polymeric additive can have at least one functional group that is water-soluble and can form crosslinks when exposed to ionizing radiation. The polymeric additive can be a comb polymer that can include polycarboxylic acid (PCA) backbones that are adsorbed onto the surface of the cement particles and polyalkyleneoxide (PAO) chains that extend into the aqueous phase of the cement composition. The polyalkyleneoxide chains can be capable of crosslinking when subjected to the ionizing radiation to create a polymer matrix within the cement composition to increase the mechanical strength of the composite prior to normal hydration setting of the cement. The PAO chains can be polyethyleneoxide chains. The cement composition can further include at least one scintillator material capable of emitting secondary ionizing, or non-ionizing, radiation upon exposure to the ionizing radiation. The ionizing radiation enable the set modifier to react to increase the mechanical strength of the composition.

Additionally disclosed herein is a cement composition containing a set modifier and a comb polymer that has cement anchoring groups and pendant ionizable dispersing groups. Further disclosed herein is a method of cementing a wellbore that includes preparing such a composition, placing the cement composition into the wellbore, and subjecting the placed cement composition mixed with the comb polymer to ionizing radiation, wherein the ionizing radiation creates crosslinks between the polymer chains. The cement anchoring groups can be polycarboxylic acid backbones of the comb polymer that are absorbed onto the surface of the cement particles. The ionizable dispersing groups can be polyalkyleneoxide chains that extend into the aqueous phase of the cement composition that can ionize and bond with adjacent ionized polyalkyleneoxide chains to form a polymer matrix within the cement composition to increase the mechanical strength of the composite prior to normal hydration setting of the cement. The cement composition and method can further include at least one scintillator material capable of emitting secondary radiation upon exposure to the ionizing radiation.

Further disclosed herein is a cement composition that includes a monomer, prepolymer, or polymer in addition to a set modifier to be placed into the wellbore subjected to ionizing radiation. Also disclosed herein is a method of using such a cement composition and subjecting the composition to ionizing radiation. The ionizing radiation initiates polymerization of the monomers or prepolymers and/or crosslinking between the polymer chains of the ionized cement composition resulting from the ionizing radiation, wherein the emitting of the ionizing radiation is subject to the control of technicians in the field. The ionizing radiation also can cause the set modifier to react and affect the composition setting. The cement composition and method can further include at least one scintillator material capable of emitting secondary radiation upon exposure to the ionizing radiation.

An alternate embodiment is a cement composition having an accelerating agent as a set modifier in addition to a polymeric additive. The accelerating agent can be encapsulated by a polymeric component that may be degraded upon exposure to ionizing radiation. Yet another embodiment is a method of cementing a wellbore that includes preparing such a cement composition, placing the cement composition into the wellbore, and subjecting the placed cement composition to ionizing radiation. The polymeric component in both embodiments serves to isolate the accelerating agent from the cement composition. The ionizing radiation is sufficient to induce the degradation of the polymeric component, thus dispersing the encapsulated accelerating agent into the cement composition.

The ionizing radiation also causes bonding between the polymeric additive constituents to create a polymer matrix in both embodiments.

An alternate embodiment is a cement composition having an oxidizing agent, a retarder, and a polymeric additive. The oxidizing agent can be encapsulated by a polymeric component that may be degraded upon exposure to ionizing radiation, but the retarder is not encapsulated by a polymeric component. Yet another embodiment is a method of cementing a wellbore that includes preparing such a cement composition, placing the cement composition into the wellbore, and subjecting the placed cement composition to the ionizing radiation. The polymeric component in both embodiments serves to isolate the oxidizing agent from the cement composition and retarder contained therein. The ionizing radiation is sufficient to induce the degradation of the polymeric component, thus dispersing the encapsulated oxidizing agent into the cement composition and subsequently degrading the retarder, thus allowing set. The ionizing radiation also causes bonding between the polymeric additive constituents to create a polymer matrix in both embodiments.

Also disclosed herein in another embodiment is a cement composition with a retarder and a polymeric additive, both of which react when exposed to ionizing radiation. Further disclosed is a method of cementing a wellbore that includes preparing such a cement composition, placing it into a wellbore, and subjecting the composition to ionizing radiation resulting from a neutron source. The radiation that is introduced into the cement composition is of sufficient strength to selectively alter or degrade the molecules of the retarder, thus allowing the curing reactions in the cement to proceed. The ionizing radiation also causes bonding between the polymeric additive constituents to create a polymer matrix. In an embodiment the retarder is a sensitized retarder, such as a boronated retarder.

A further embodiment is a cement composition including an accelerating agent, a retarder, and a polymeric additive. When the composition is subjected to ionizing radiation that is of sufficient strength to selectively alter or degrade the molecules of the retarder, the accelerating agent is allowed to take effect resulting in the rapid curing of the cement mixture. The ionizing radiation also causes the polymeric additive to react with the cement composition. In an optional embodiment, the cement mixture includes a sensitized retarder, a polymeric additive, and accelerating agent added to a composition including cement and water. In an alternative embodiment, the accelerating agent is encapsulated by a polymer capsule, which serves to isolate the accelerating agent from the cement composition. Introducing ionizing radiation may be sufficient to induce the degradation of the polymer capsule, thus dispersing the encapsulated accelerating agent into the cement composition. The ionizing radiation may also cause bonding between the polymeric additive constituents to create a polymer matrix.

Yet another embodiment is a method of cementing a wellbore that includes preparing a cement composition including an accelerating agent, a retarder, and a polymeric additive, placing the resulting cement composition into a wellbore, and subjecting the placed cement composition to ionizing radiation that is of sufficient strength to selectively alter or degrade the molecules of the retarder, thus allowing the accelerating agent to take effect, resulting in the rapid curing of the cement mixture. The ionizing radiation also causes the polymeric additive to react with the cement composition.

In an optional embodiment, the method includes preparing a cement mixture by first adding a sensitized retarder, followed by adding an accelerating agent and polymeric additive to the composition including cement, water, and a sensitized retarder. In an alternative embodiment, the accelerating agent is encapsulated by a polymer capsule, which serves to isolate the accelerating agent from the cement composition. The step of introducing the ionizing radiation may be sufficient to induce the degradation of the polymer capsule, thus dispersing the encapsulated accelerating agent into the cement composition. The ionizing radiation may also cause bonding between the polymeric additive constituents to create a polymer matrix.

The preceding has outlined rather broadly the features and technical advantages of the present invention in order that the detailed description of the invention may be more fully understood. The features and technical advantages of the present invention will be readily apparent to those skilled in the art upon a reading of the detailed description of the embodiments of the invention, which follows.

DETAILED DESCRIPTION

The present invention relates generally to wellbore operations involving fluids or slurries, and more particularly, to fluids or slurries that contain polymer or polymer precursors that can be reacted on command to provide thickening to the fluid or slurry and that contain accelerating agents and/or retarders that can be released, activated and/or deactivated on command to provide thickening or setting to the fluid or slurry. The fluids or slurries can be referred to herein as a wellbore treatment fluid and can be any fluid or slurry suitable for wellbore operations, drilling, completion, workover or production operations such as cements, drilling muds, lost circulation fluids, fracturing fluids, conformance fluids, sealants, resins, etc. and combinations thereof. One embodiment of the present invention relates to wellbore cementing operations, and more particularly, to methods of cementing in wellbores using cementitious compositions that contain accelerating agents and/or retarders that can be released and/or deactivated on command and polymeric additives that can form a polymer matrix through bonds upon exposure to ionizing radiation. Another embodiment relates to such cementitious compositions that contain polymeric additives and accelerating agents and/or retarders.

In embodiments the fluid or slurry is a cementitious composition generally including water and a cement component such as hydraulic cement, which can include calcium, aluminum, silicon, oxygen, and/or sulfur, which sets and hardens by reaction with the water.

Figure 1:
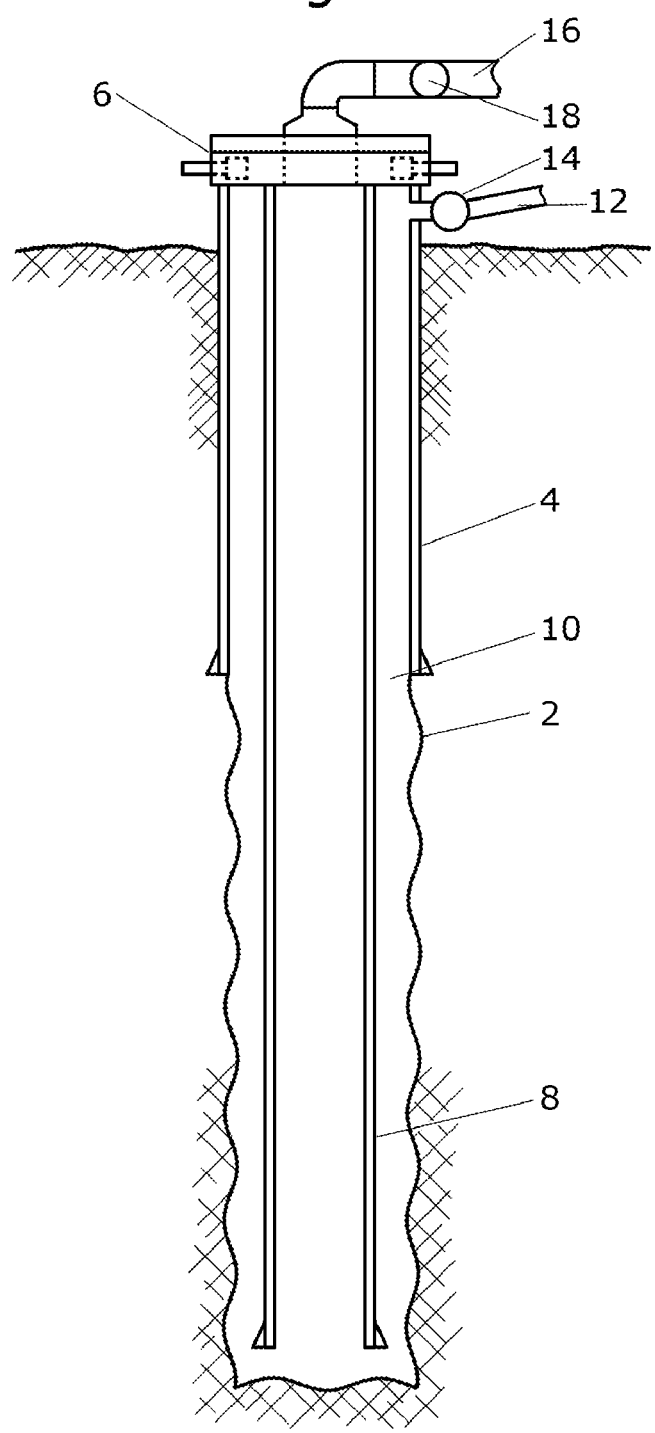
FIG. 1 illustrates a cross sectional side view of a wellbore.

Referring to FIG. 1, a cross sectional side view of an embodiment of a wellbore 2 is illustrated. Surface casing 4, having a wellhead 6 attached, is installed in the wellbore 2. Casing 8 is suspended from the wellhead 6 to the bottom of the wellbore 2. An annulus 10 is defined between casing 8 and the wellbore 2. Annulus flow line 12 fluidly communicates with annulus 10 through the wellhead 6 and/or surfacing casing 4 with an annulus valve 14. Flow line 16 is connected to the wellhead 6 to allow fluid communication with the inner diameter of casing 8 and a casing valve 18. At the lower most end of casing 8 the casing is open to the wellbore 2 or has circulation ports in the walls of casing 8 (not shown) to allow fluid communication between the annulus 10 and the inner diameter of casing 8.

A cement fluid composition can be pumped down the casing 8 and circulated up the annulus 10 while fluid returns are taken from the annulus 10 out flow line 12, in a typical circulation direction. Alternately the cement fluid composition can be pumped into the annulus 10 from annulus flow line 12 while fluid returns are taken from the inner diameter of casing 8 through flow line 16. Thus, fluid flows through wellbore 2 in a reverse circulation direction. The casing can be a drill string after the completion of the drilling operations. The drilling fluid can be circulated out of the wellbore and replaced with a different drilling fluid, completion fluid, cement slurry, and the like.

In an alternate method a fluid composition, such as a cement slurry, can be placed within the wellbore 2 and a sealed or filled tubular, such as casing 8, can be lowered into the wellbore 2 such that the fluid composition is displaced into the annulus 10 area, thereby placing the fluid composition within the annulus 10 without pumping the fluid composition into the annulus 10. The above method can be referred to as puddle cementing. The fluid composition can be a drilling fluid placed within the wellbore after drilling operations are complete.

Any cement suitable for use in subterranean applications may be suitable for use in the present invention. In certain embodiments, the cement compositions used in the present invention include hydraulic cement. Examples of hydraulic cements include but are not limited to Portland cements (e.g., Classes A, C, G, and H Portland cements), pozzolana cements, gypsum cements, phosphate cements, high alumina content cements, silica cements, high alkalinity cements, and combinations thereof. Cements including shale, cement kiln dust or blast furnace slag also may be suitable for use in the present invention. In certain embodiments, the shale may include vitrified shale; in certain other embodiments, the shale may include raw shale (e.g., unfired shale), or a mixture of raw shale and vitrified shale.

The compositions used in the present invention generally include a base fluid. A wide variety of base fluids may be suitable for use with the present invention, including, inter alia, an aqueous-based base fluid, a nonaqueous-based base fluid, and mixtures thereof. Where the base fluid is aqueous-based, it may include water that may be from any source, provided that the water does not contain an excess of compounds (e.g., dissolved organics, such as tannins) that may adversely affect other compounds in the cement compositions. For example, a cement composition useful with the present invention can include fresh water, salt water (e.g., water containing one or more salts dissolved therein), brine (e.g., saturated salt water), or seawater. Where the base fluid is nonaqueous-based, the base fluid may include any number of organic liquids. Examples of suitable organic liquids include, but are not limited to, mineral oils, synthetic oils, esters, and the like. In certain embodiments of the present invention wherein primary cementing is performed, an aqueous-based base-fluid may be used. The base fluid may be present in an amount sufficient to form a pumpable slurry. More particularly, in certain embodiments wherein the base fluid is water, the base fluid may be present in the cement compositions used in the present invention in an amount in the range of from about 25% to about 150% by weight of cement ("bwoc"). In certain embodiments wherein the base fluid is water, the base fluid may be present in the cement compositions in the range of from about 30% to about 75% bwoc. In still other embodiments wherein the base fluid is water, the base fluid may be present in the cement compositions in the range of from about 40% to about 60% bwoc. In still other embodiments wherein the base fluid is water, the base fluid may be present in the cement compositions in the range of from about 35% to about 50% bwoc. The cement composition may include a sufficient amount of water to form a pumpable cementitious slurry. The water may be fresh water or salt water, e.g., an unsaturated aqueous salt solution or a saturated aqueous salt solution such as brine or seawater.

The fluid or slurry compositions used in the present invention can further include a set retarder. Set retarding admixtures lengthen the time at which the fluid or slurry composition remains a fluid. These retarding admixtures consequently allow a fluid or slurry wellbore treatment fluid, such as cement, to be pumped along long distances without the effect of premature setting. A broad variety of set retarders may be suitable for use in the cement compositions used in the present invention. For example, the set retarder may include, inter alia, phosphonic acid, phosphonic acid derivatives, lignosulfonates, salts, sugars, carbohydrate compounds, organic acids, carboxymethylated hydroxyethylated celluloses, synthetic co- or ter-polymers having sulfonate and carboxylic acid groups, and/or borate compounds. In certain embodiments, the set retarders used in the present invention are phosphonic acid derivatives, such as those described in U.S. Pat. No. 4,676,832, the entire disclosure of which is hereby incorporated herein. Examples of suitable borate compounds include, but are not limited to, sodium tetraborate and potassium pentaborate. Examples of suitable organic acids include, inter alia, gluconic acid and tartaric acid. Generally, the set retarder is present in the cement compositions used in the present invention in an amount sufficient to delay the setting of the cement composition in a subterranean formation for a desired time. More particularly, the set retarder may be present in the cement compositions used in the present invention in an amount in the range of from about 0.1% to about 10% bwoc. In certain embodiments, the set retarder is present in the cement compositions used in the present invention in an amount in the range of from about 0.5% to about 4% bwoc. In an embodiment of the present invention the imposition of the ionizing radiation results in the alteration or destruction of a set retarder additive. As the set retarder is altered by the exposure to the ionizing radiation the effect of the set retarder on the slurry is reduced and the slurry can set sooner than it would in the absence of the ionizing radiation.

The set retarders of the current invention may include a sensitizer-containing retarder, such as a boron-containing retarder. The sensitizer can be made from a material having a strong radiation absorption property. The sensitizer can also be a scintillator material. The sensitizer can be any material that increases the capture efficiency of the ionizing radiation within the slurry. This sensitizer-containing retarder, also referred to as a sensitized retarder, can be a boron-containing retarder, also referred to as a boronated retarder, may include a wide variety of set retarders, including the set retarders disclosed herein, wherein the selected set retarder, or combination or set retarders, additionally includes at least one boron atom. As discussed in the immediately preceding paragraph, sugars and/or carbohydrates can be used as a retarder in the setting of a cement composition. In an embodiment, the retarder is a sensitized sugar or carbohydrate. In a more specific embodiment, the sensitized retarder is boronated glucose. In an even more specific embodiment, the boronated glucose is represented by 3-O-(o-Carborany-1-ylmethyl)-D-glucose, as presented in U.S. Pat. No. 5,466,679, to Soloway et al.

Optionally, the compositions used in the present invention may include a fluid loss control additive. A variety of fluid loss control additives may be suitable for use with the present invention, including, inter alia, fibers, flakes, particulates, modified guars, latexes, and acrylamide methyl sulfonic acid copolymers such as those that are further described in U.S. Pat. Nos. 4,015,991; 4,515,635; 4,555,269; 4,676,317; 4,703,801; 5,339,903; and 6,268,406, the entire disclosures of which are hereby incorporated herein by reference. Generally, the fluid loss control additive is present in the cement compositions used in the present invention in an amount sufficient to provide a desired degree of fluid loss control. More particularly, the fluid loss control additive may be present in the cement compositions used in the present invention in an amount in the range of from about 0.1% to about 10% bwoc. In certain embodiments, the fluid loss control additive is present in the cement compositions used in the present invention in an amount in the range of from about 0.2% to about 3% bwoc.

Optionally, the compositions used in the present invention also may include a mechanical-property modifier. Examples of suitable mechanical-property modifiers may include, inter alia, gases that are added at the surface (e.g., nitrogen), gas-generating additives that may generate a gas in situ at a desired time (e.g., aluminum powder or azodicarbonamide), hollow microspheres, elastomers (e.g., elastic particles including a styrene/divinylbenzene copolymer), high aspect ratio materials (including, inter alia, fibers), resilient graphitic materials, vapor/fluid-filled beads, matrix-sorbable materials having time-dependent sorption (initiated by, e.g., degradation), mixtures thereof (e.g., mixtures of microspheres and gases), or the like. In certain embodiments of the present invention, the optional mechanical-property modifier may include a latex.

In certain optional embodiments wherein microspheres are added to a wellbore treatment fluid or slurry composition, such as cement compositions useful with the present invention, the microspheres may be present in the cement compositions in an amount in the range of from about 5% to about 75% bwoc. In certain embodiments of the present invention, the inclusion of microspheres in the cement compositions useful with the present invention may reduce the density of the cement composition.

In certain optional embodiments wherein one or more gas-generating additives are used as mechanical property modifiers in the fluid or slurry compositions used in the present invention, the one or more gas-generating additives may include, inter alia, aluminum powder that may generate hydrogen gas in situ, or they may include azodicarbonamide that may generate nitrogen gas in situ. Other gases and/or gas-generating additives also may be suitable for inclusion in the fluid or slurry compositions used in the present invention. Where included, a gas-generating additive may be present in cement compositions in an amount in the range of from about 0.1% to about 5% bwoc. In certain embodiments where the gas-generating additive is aluminum powder, the aluminum powder may be present in the cement compositions in an amount in the range of from about 0.1% to about 1% bwoc. In certain embodiments where the gas-generating additive is an azodicarbonamide, the azodicarbonamide may be present in the cement compositions in an amount in the range of from about 0.5% to about 5% bwoc.

Optionally, the fluid or slurry compositions used in the present invention also may include additional suitable additives, including defoaming agents, dispersants, density-reducing additives, surfactants, weighting materials, viscosifiers, fly ash, silica, free water control agents, and the like. Any suitable additive may be incorporated within the fluid or slurry compositions used in the present invention.

In an embodiment of the present invention, the fluid or slurry includes a polymeric additive that can be a monomer, prepolymer, homopolymer, copolymer, terpolymer, hyper-branched, dendritic polymer, a water-soluble crosslinkable polymer, a comb polymer, and combinations thereof, that crosslink when exposed to the ionizing radiation. In an embodiment the polymeric additive is selected from the group of: a poly(alkyleneoxide), poly(vinyl pyrrolidone), poly(vinyl alcohol), a polyacrylamide, a polyacrylate, poly (vinyl methyl ether), and combinations thereof.

In an embodiment the compositions and methods of using the present invention may also include bridging agents. The bridging agent can be selected from the group including ethylene glycol, propylene glycol, diethylene glycol, poly vinyl pyrrolidone, poly vinyl alcohol, poly vinyl methyl ether, poly acryl amide, polyols (alcohols containing multiple hydroxyl functional groups), polyacrylates and combinations thereof.

In an embodiment of the present invention, the fluid or slurry includes a monomer additive. The monomer additive may be a synthetic or natural monomer. Examples of synthetic monomers include hydrocarbons such as ethylene, propylene or styrene monomers. Other synthetic monomers that can be used include the acrylic monomers such as acrylic acid, methyl methacrylate and acrylamide. In an embodiment, the monomer additive is present in amounts of from about 0.01% to about 10.0% bwoc, optionally from about 0.05% to about 7.5% bwoc, optionally from about 0.25% to about 2.5% bwoc.

In an embodiment of the present invention, the fluid or slurry includes one or more ethyleneically unsaturated monomer that is polymerizable by ionizing radiation. The ethyleneically unsaturated monomer can be any monomer containing one or more $CH_2=C<$ group, which are polymerizable by ionizing radiation. Non-limiting examples of ethyleneically unsaturated monomers that can be utilized include vinyl monomers such as n-vinyl-2-pyrrolidone, unsaturated esters of organic acids such as 2-hydroxyethyl acrylate, 2-hydroxyethyl methacrylate and the like, unsaturated acids such as acrylic acid, methacrylic acid and the like, unsaturated amides such as acrylamide, methacrylamide and the like.

Optionally the slurry can contain ethyleneically unsaturated monomers containing more than one $CH_2=C<$ group, that can function as crosslinkers. Non-limiting examples of ethyleneically unsaturated monomers containing more than one $CH_2=C<$ group include N'N-methylene bis(acrylamide) (MBA), polyethylene glycol diacrylate (PEGDA), tetra(ethylene glycol) diacrylate (TEGDA) and the like.

The ethyleneically unsaturated monomers can undergo both polymerization and crosslinking and therefore can result in gelation of the slurry at reduced radiation doses. As the starting materials are monomers, a higher monomer loading can be used than what is possible with polymers, without adversely affecting the rheology profile, and thus can result in higher gel strengths and/or reduced radiation dosage needed.

In an embodiment, the fluid or slurry includes a crosslinkable prepolymer additive. The prepolymer additive can be a polymer intermediate, or a reactive low-molecular-weight macromolecule, or an oligomer, capable of being hardened by further polymerization. An example of a prepolymer is polyurethane prepolymer that is commercially available and well known in the art. Prepolymers can include crosslinkable functional groups that are attached to an element or compound, such as a crosslinkable prepolymer functional group attached to a polymeric material. In an embodiment, the prepolymer additive is present in amounts of from about 0.01% to about 10.0% bwoc, optionally from about 0.05% to about 7.5% bwoc, optionally from about 0.25% to about 2.5% bwoc.

In an embodiment, the fluid or slurry includes a polymer additive. Examples of the polymer additive include a monomer, prepolymer, or polymer. The polymeric additive can be a homopolymer, copolymer, terpolymer, hyperbranched or dendritic polymer. In embodiments the polymeric additive can be selected from a poly(alkyleneoxide), poly(vinyl pyrrolidone), poly(vinyl alcohol), a polyacrylamide, a polyacrylate, poly(vinyl methyl ether), and combinations thereof.

The polymeric additive can contain at least one functional group that can bond to the surface of the cement particles and at least one functional group that is water-soluble and can form crosslinks when exposed to the ionizing radiation. The polymeric additive can be a comb polymer. In an embodiment, the polymer additive is present in amounts of from about 0.01% to about 25.0% bwoc, optionally from about 0.05% to about 7.5% bwoc, optionally from about 0.25% to about 2.5% bwoc.

In an embodiment the polymeric additive is a polycarboxylate polymer superplasticizer (PCS). Superplasticizers can be useful in reducing the amount of water required to fluidify a cement mixture, and/or to impart thixotropic properties. The PCS can include one or more polymers, or copolymers, terpolymers and polymeric additive solutions thereof. In an embodiment, the PCS is a comb type polymer. The comb polymer can have a polycarboxylic acid backbone and sidechains of polyalkyleneoxide (PAO) chains that have either been grafted onto the polycarboxylic acid backbone or bonded to a polymerizable carboxylic acid that is subsequently polymerized. When added to a slurry the polycarboxylic acid backbones can be absorbed onto a particle surface. For example with a cement slurry, the polycarboxylic acid backbones can be absorbed onto a cement particle surface, whereas the hydrophilic PAO chains extend into the aqueous phase. As the polycarboxylic acid backbones are absorbed onto the cement surface they are anchored to the cement surface and can resist forces to disassociate. The PAO chains extend from the polycarboxylic acid backbone into the aqueous phase. The PAO chains can then be ionized, such as through the imposition of the ionizing radiation, and can react with ionized PAO chains extending into the aqueous phase from an adjacent PCS polymer attached to an adjacent cement particle. The ionized PAO chains can bond with other ionized PAO chains forming a polymer lattice structure throughout the cement slurry. The polymer lattice structure can impart rigidity to the cement slurry prior to the setting of the cement slurry through the normal hydration setting process.

In an embodiment the polymeric additive is a polycarboxylate comb polymer superplasticizer having a backbone polymeric chain which serves as an anchoring group and having pendant non-ionized dispersing groups. The quantity of ionized particle anchoring groups and non-ionized dispersing groups and their relative ratio is not limited within the present invention. In an embodiment the ratio of the ionized particle anchoring groups ranges from about 1:100 to about 100:1 with respect to the non-ionized dispersing groups. Alternately the ratio of the ionized particle anchoring groups is about 1:50 to about 50:1, optionally about 1:1 to about 25:1 with respect to the non-ionized dispersing groups. The ionized particle anchoring group can be absorbed onto a particle surface, whereas the non-ionized dispersing groups extend into the aqueous phase. The non-ionized dispersing groups can then be ionized, such as through the imposition of the ionizing radiation, and can react with each other forming a polymer lattice structure throughout the slurry that thickens the slurry. Further, polycarboxylate polymer molecules are available with multiple lengths of pendant polyalkylene oxide groups, wherein the selection of the correct ratio can control both workability retention and rate of crosslinking upon exposure to the ionizing radiation. Polycarboxylate polymer superplasticizers (PCS) that are suitable for use in the current invention are commercially available from companies such as BASF and W. R. Grace, Sika, Nippon Shokubai, Kao Soap, Nippon O10 and Fats, and others.

In an embodiment the polymeric additive is a polymer selected from a group including of polyalkyleneoxide (PAO), poly vinyl pyrrolidone (PVP), poly vinyl alcohol (PVA), poly vinyl methyl ether (PVME), poly acrylamide (PAAm). The polymeric chains can be dispersed within the aqueous phase of the fluid or slurry and can be ionized, such as through the imposition of the ionizing radiation, to react with adjacent ionized polymeric chains. The linking of adjacent ionized polymeric chains forms a polymer lattice structure throughout the fluid that imparts thickening to the aqueous phase. The polymer lattice structure can impart thickening to cement slurry prior to the setting of the cement slurry through the normal hydration setting process. In alternate embodiments the polymer lattice structure can impart thickening to other fluids such as a conformance fluid used to seal a water-bearing zone or to a settable drilling fluid. The polymeric additive can be a water-soluble polymer that can be cross-linked upon exposure to the ionizing radiation. The polymeric additive can also be a comb polymer with at least two functional groups, one that can be anchored, such as to a cement grain, and another that can be cross-linked upon exposure to the ionizing radiation.

In an embodiment of the present invention the imposition of the ionizing radiation results in the alteration or destruction of the polymeric additive. As the polymeric additive is altered by the exposure to the ionizing radiation, the resulting altered polymeric additive can result in a thickening of the slurry. In embodiments the slurry can thicken sooner than it would in the absence of the ionizing radiation.

The compositions and methods of using the present invention may also include an accelerator. The accelerator aids in overcoming possible delays caused by the set retarders by shortening the setting time of the fluid or slurry composition. A broad variety of accelerators may be suitable for use in the fluid or slurry compositions used in the present invention, the accelerator may include any component that reduces the setting time of a cement composition. For example, the accelerator may include alkali and alkali earth metal salts, silicate salts, aluminates and amines, such as triethanolamine. In an embodiment, the accelerator is a calcium salt. The calcium salt may be selected from the group consisting of calcium formate, calcium nitrate, calcium nitrite and calcium chloride. In a specific embodiment, the accelerator is calcium chloride. The accelerator may be present in the fluid or slurry compositions used in the present invention in an amount in the range of from about 0.1% to about 20% bwoc. In certain embodiments, the accelerator is present in the cement compositions used in the present invention in an amount in the range of from about 4% to about 12% bwoc.

The accelerators of the current invention may be combined with a polymeric component. In an embodiment the accelerator is encapsulated by the polymeric component. In another aspect, the accelerator is uniformly mixed with the polymeric, which acts as a binder, the resulting mixture is then pressed into a pellet. In yet another aspect, the resulting pellet is ultimately encapsulated by a polymeric component. The polymeric component used as a binder in forming the pellet may be of a different composition from the polymeric component used in encapsulating the pellet. Further, it may be of a composition sensitive to alkaline hydrolysis, such that the alkaline environment of the cement system contributes to its more rapid degradation. The encapsulating polymer layer can be applied using a polymer coating method selected from the group consisting of dip coating, spray coating, extrusion coating, transfer printing and any combination thereof. The encapsulating polymer layer may also be applied using any common polymer coating method.

The oxidizing agents of the current invention may be combined with one or more polymeric components. They may be present in an amount of about 0.05% to about 5% of the fluid or slurry composition, and capable of attacking any set retarder present. In an embodiment the oxidizer is encapsulated by the polymeric component. In another aspect, the oxidizer is uniformly mixed with the polymeric component, which acts as a binder, the resulting mixture is then pressed into a pellet. In yet another aspect, the resulting pellet is ultimately encapsulated by a polymeric component. The polymeric component used as a binder in forming the pellet may be of a different composition from the polymeric component used in encapsulating the pellet and may be selected from polymer especially resistant to oxidation. Subjecting the fluid or slurry composition to the ionizing radiation can enable the release of the oxidizing agent which reduces the retarding capability of the retarder, allowing set.

In an embodiment the polymeric component selected in the present invention is durable in the high alkaline environment found in cement and exhibits a low tolerance to the ionizing radiation. In more specific embodiments, the polymeric component exhibits a radiation tolerance of less than about 500 KiloGrays, optionally less than about 250 KiloGrays, optionally less than about 100 KiloGrays. Alternatively, the polymeric component has a radiation tolerance of from about 4 to about 65 KiloGrays. In an optional embodiment, the polymeric component has a radiation tolerance of from between about 1 Gray to about 500 KiloGray, optionally between about 1 Gray to about 100 KiloGray, optionally between about 20 Gray to about 40 KiloGray. A non-limiting listing of polymer degradation upon exposure to ionizing radiation is given in Table 1.

TABLE 1

| Polymer | Tolerance (kGy) |
|---|---|
| Teflon | 5 |
| Polyacetals | 15 |
| Propylene-ethylene copolymers | 25-60 |
| Aliphatic Nylons | 50 |
| Polystyrene | 10,000 |
| Phenolics | 50,000 |

In an aspect, the polymeric component is selected from the group of polyisobutylene, fluoroelastomers, silicon rubber, polyesters, polytetrafluoroethylene (PTFE) (available under the trade name TEFLON® from E.I. du Pont de Nemours and Company), polyacetals (available under the trade name DELRIN® from E.I. du Pont de Nemours and Company and under the trade name CELCON® from Ticona), polypropylene, copolymers of polypropylene-ethylene, polymethylpentene, fluorinated ethylene-propylene, perfluoroalkoxy (PFA), polymethylmethacrylate (PMMA) and combinations thereof.

Figure 5:
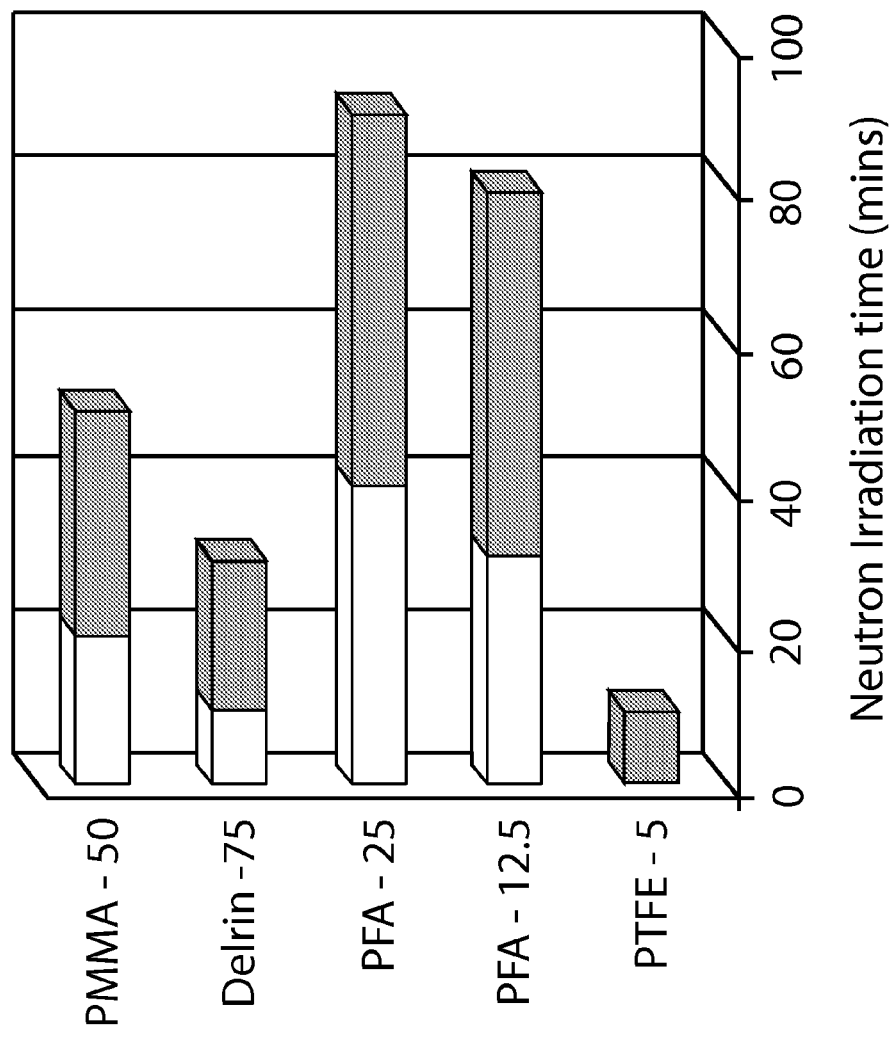
FIG. 5 is a graph of polymer embrittlement due to neutron irradiation for films of various materials and thickness.
Figure 6:
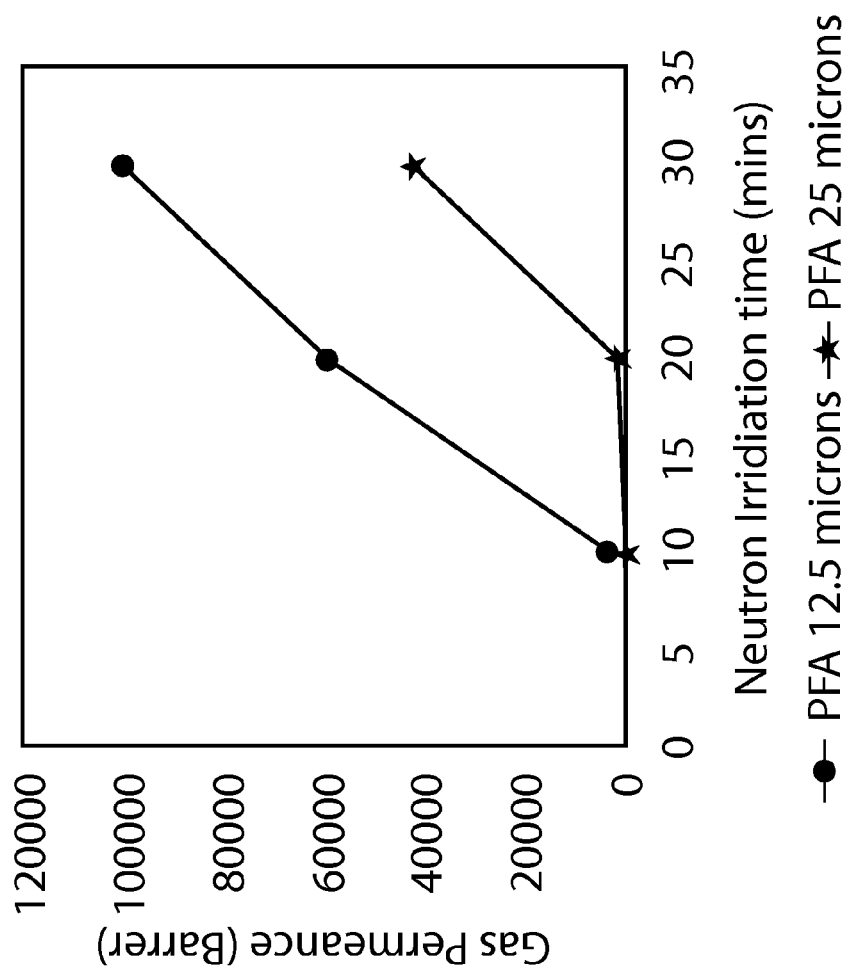
FIG. 6 is a graph of gas permeance for two polymer films of differing thickness upon exposure to neutron irradiation.

Referring to FIGS. 5 and 6, various polymer films were exposed to a neutron flux of $1.2 \times 10^{13}$/s and tested for embrittlement and gas permeability over time. The film material and thickness were PMMA at 50 microns; Delrin at 75 microns; PFA at 25 and 12.5 microns; and PTFE at 5 microns. FIG. 5 illustrates that PMMA with a thickness of 50 microns shows embrittlement effect at about 18 minutes and at about 50 minutes the film had degraded to a degree that it could no longer be tested. The darkened area of the bar shows when embrittlement from the neutron flux is observed and when it has degraded to a degree that it could no longer be tested. It is also seen that some materials such as Delrin are more susceptible to radiation degradation than other materials such as PMMA or PFA. The Delrin film with a thickness of 75 microns degrades before the PFA having a thickness of 12.5 microns.

FIG. 6 illustrates the effect of film thickness on gas permeability and that the PFA film of 25 microns thickness retains gas impermeability for about twice as long as a PFA film of 12.5 microns thickness exposed to the same radiation. FIG. 6 also illustrates that both PFA films observed gas permeability at a time earlier than the embrittlement effect was observed as shown in FIG. 5.

Figure 7:
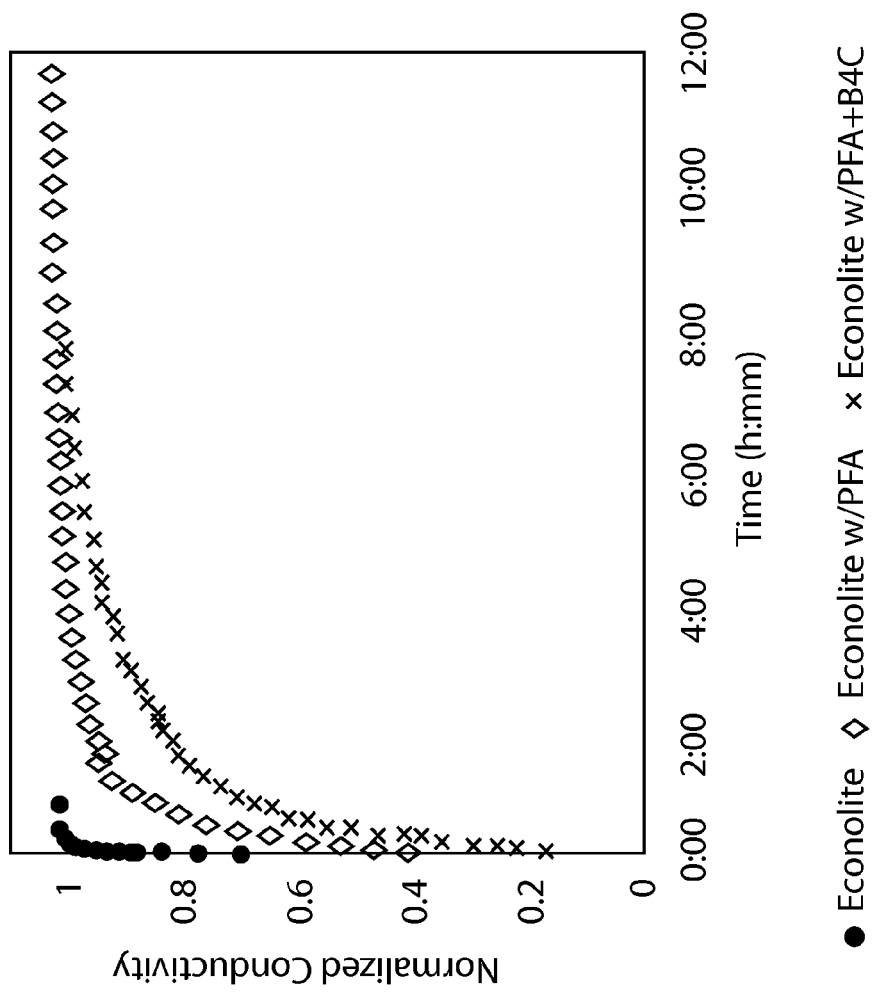
FIG. 7 is a graph of conductivity illustrating the delayed release of an encapsulated material upon exposure to neutron irradiation.

Referring to FIG. 7, a sample of sodium metasilicate, available as Econolite from Halliburton, was coated with a layer of FluoroPel™ PFA and with a layer of FluoroPel™ PFA with $B_4C$. The sample was exposed to a neutron flux of $1.2 \times 10^{13}$/s and tested for conductivity over time. FIG. 7 shows that the coating provided a delayed release profile of the sodium metasilicate that is relative to the radiation exposure. FluoroPel™ is available from Cytonix corporation.

In a further example a sample of Uranine dye on a glass slide was encapsulated using FluoroPel™ PFA with a thickness of approximately 36 microns in a container of fluid. The encapsulated dye was exposed to a neutron flux of $1.2 \times 10^{13}$/s for 50 minutes, during which the Uranine dye had visibly colored the fluid, indicating its dissipation into the fluid.

The polymeric component of the embodiments may also contain an additional material to promote the degradation of the polymer and/or the release of the accelerator into the wellbore treatment fluid or slurry composition. In an embodiment, a promoter for free-radical chain scissioning is added to the polymer capsule and/or the polymeric component used as a binder to accelerate the polymer degradation once triggered by exposure to the ionizing radiation. In a further embodiment, the polymeric component may also contain a sensitizer made from a material having a strong radiation absorption property. The promoter or sensitizer can be any material that increases the capture efficiency of the ionizing radiation within the slurry. In embodiments the promoter or sensitizer material is a boron compound, such as boron carbide or boron nitride. In embodiments the promoter or sensitizer material has an ionizing radiation tolerance of less than 500 KiloGrays optionally from 1 Gray to 500 KiloGrays.

Compositions of this invention may include forming a sealant composition containing the set modifier alone or combined with a polymeric component. Methods of this invention for isolating a portion of a wellbore may include forming such a sealant composition including a set modifier, pumping the sealant composition containing the set modifier into a wellbore, and subjecting the sealant composition to ionizing irradiation after placement into the wellbore. The set modifier of the invention may be combined with a polymeric component. The polymeric component can serve to prevent the release of the set modifier, such as an accelerator, into the sealant composition. The ionizing radiation introduced is sufficient to dissolve, degrade, or otherwise break down, the polymeric component thus allowing the set modifier to be released into the sealant composition. Once the set modifier is released, it is dispersed into and reacts with the sealant composition, resulting in the initiation of the setting process. The release of the ionizing radiation, which is under the control of technicians in the field, thus acts as a trigger in initiating the setting of the sealant composition.

The polymeric component may be combined with the set modifier by means of encapsulation, binding with the set modifier in a mixture, or both. The polymer coating used in the methods of this invention may be any polymeric component that will degrade upon being subjected to the ionizing radiation. In an embodiment, the polymeric component will degrade from exposure to gamma radiation. In another embodiment, the polymeric component will degrade from exposure to gamma radiation in levels of less than about 500 KiloGrays. In an alternate embodiment, the polymeric component will degrade from exposure to gamma radiation in levels of between about 1 Gray to about 500 KiloGray, optionally between about 1 Gray to about 100 KiloGray, optionally between about 20 Gray to about 40 KiloGray. In yet another embodiment, the polymer will degrade from the ionizing radiation emitted from a gamma ray generator that is also used on oil well logging instruments.

The type and level of the ionizing radiation used in the methods of this invention may depend upon the polymeric component(s) that are combined with the accelerator. The type and level of the ionizing radiation may be dependent upon what is capable of degrading the polymer component(s). In an embodiment, the type of ionizing radiation includes alpha rays, beta rays, gamma rays, neutron rays, proton rays, UV rays and X-rays, or combinations thereof. In an optional embodiment, the amount of the ionizing radiation required to degrade the polymeric component(s) is less than about 500 KiloGrays. In an optional embodiment, the amount of ionizing radiation required to degrade a polymeric component is between about 1 Gray to about 500 KiloGray, optionally between about 1 Gray to about 100 KiloGray, optionally between about 20 Gray to about 40 KiloGray.

Methods of this invention for isolating a wellbore may include forming a sealant composition including a set modifier and a polymeric additive, pumping the sealant composition containing the set modifier into a wellbore and subjecting the sealant composition to ionizing radiation after placement into the wellbore. The set modifier of the invention may be a retarder, optionally a sensitized retarder, such as a boronated retarder. The sensitized retarder of the invention is susceptible to certain types of ionizing irradiation. The ionizing radiation introduced is sufficient to dissolve or otherwise break down the retarder, thus allowing the setting of the sealant composition to proceed. The ionizing radiation also causes bonding between the polymeric additive constituents to create a polymer matrix.

Sealant compositions of this invention may include a set modifier and a polymeric additive. The set modifier of the invention may be a retarder, optionally a sensitized retarder, such as a boronated retarder. The sensitized retarder of the invention is susceptible to certain types of ionizing irradiation. The ionizing radiation introduced is sufficient to dissolve or otherwise break down the retarder, thus allowing the setting of the sealant composition to proceed. The ionizing radiation also causes bonding between the polymeric additive constituents to create a polymer matrix.

Methods of this invention for isolating a wellbore may include forming a sealant composition that includes an accelerator and/or oxidizing agent, a retarder, and a polymeric additive, and exposing the sealant composition to ionizing radiation. The accelerator and/or oxidizing agent can be released or activated by exposure of the sealant composition to the ionizing radiation, thus able to accelerate the setting of the sealant composition. The retarder can be altered upon exposure of the sealant composition to the ionizing radiation, thus its ability to retard the setting of the sealant composition can be hindered. The polymeric additive may react with the sealant composition to increase the mechanical strength of the sealant composition.

Sealant compositions of this invention may include an accelerator and/or oxidizing agent, a retarder, and a polymeric additive, all of which are exposed to ionizing radiation upon placement. The accelerator and/or oxidizing agent can be released or activated by exposure of the sealant composition to the ionizing radiation, thus enabling the sealant composition setting to be accelerated. The retarder can be altered upon exposure of the sealant composition to the ionizing radiation, thus hindering its ability to retard the setting of the sealant composition. The polymeric additive may react with the sealant composition to increase the mechanical strength of the sealant composition.

Methods of this invention for cementing a wellbore may include the steps of forming a cement composition including hydraulic cement and a sufficient amount of water to form a slurry, adding to the slurry a desired amount of an accelerator or oxidizing agent and a polymeric additive, pumping the slurry containing the accelerator and/or oxidizing agent and polymeric additive into a wellbore, and subjecting the slurry to ionizing irradiation after placement of the slurry into the wellbore. The accelerator and/or oxidizing agent of the invention may be combined with a polymeric component. The polymeric component serves to prevent the release of the accelerator and/or oxidizing agent into the cement slurry. The ionizing radiation may cause the polymeric additive to form crosslinks in the cement composition. The ionizing radiation introduced is sufficient to dissolve, degrade, or otherwise break down the polymeric component, thus allowing the accelerator and/or oxidizing agent to be released into the cement slurry. Once the accelerator and/or oxidizing agent is released, it is dispersed into the cement slurry and reacts with the slurry or the retarder, resulting in the initiation of the setting process. The release of the ionizing radiation, which is under the control of technicians in the field, thus acts as a trigger in initiating the setting of the cement slurry.

Cement compositions of this invention may include the hydraulic cement and a sufficient amount of water to form a slurry, an accelerator and/or oxidizing agent, and a polymeric additive. The accelerator and/or oxidizing agent of the invention may be combined with a polymeric component. Upon placement in a wellbore and exposure to ionizing radiation, constituents of the cement composition may react to affect the setting or thickening of the composition. The ionizing radiation may cause the polymeric additive to form crosslinks in the cement composition. The polymeric component serves to prevent the release of the accelerator and/or oxidizing agent into the cement slurry until the ionizing radiation introduced is sufficient to dissolve, degrade, or otherwise break down the polymeric component, thus allowing the accelerator and/or oxidizing agent to be released into the cement slurry. Once the accelerator and/or oxidizing agent is released, it is dispersed into the cement slurry and reacts with the slurry or the retarder, resulting in the initiation of the setting process. The release of the ionizing radiation, which is under the control of technicians in the field, thus acts as a trigger in initiating the setting of the cement slurry.

The polymeric component may be combined with the accelerator and/or oxidizing agent by means of encapsulation, binding with the mixture, or both. The polymer coating used in the methods of this invention may be any polymeric component that will degrade upon being subjected to the ionizing radiation. In an embodiment, the polymeric component will degrade from exposure to gamma radiation. In another embodiment, the polymeric component will degrade from exposure to gamma radiation in levels of less than about 500 KiloGrays. In an optional embodiment, the amount of gamma radiation required to degrade a polymeric component is between about 1 Gray to about 500 KiloGray, optionally between about 1 Gray to about 100 KiloGray, optionally between about 20 Gray to about 40 KiloGray. In yet another embodiment, the polymer will degrade from the ionizing radiation emitted from a gamma ray generator that is also used on oil well logging instruments.

The type and level of the ionizing radiation used in the methods of this invention may depend upon the polymeric component(s) that are combined with the accelerator and/or oxidizing agent. The type and level of the ionizing radiation may be dependent upon what is capable of degrading the polymer component(s). In an embodiment, the type of ionizing radiation includes alpha rays, beta rays, gamma rays, X-rays, or combinations thereof. In an optional embodiment, the amount of ionizing radiation required to degrade the polymeric component(s) is less than about 500 KiloGrays.

Methods of this invention for cementing a wellbore may include the steps of forming a cement composition including hydraulic cement and a sufficient amount of water to form a slurry, adding to the slurry a desired amount of a retarder and a polymeric additive, pumping the slurry containing the retarder and polymeric additive into a wellbore, and subjecting the slurry to ionizing radiation after placement of the slurry into the wellbore. The retarder of the invention may be a sensitized retarder as disclosed herein, such as a boronated retarder. The sensitized retarder and polymeric additive of the invention are susceptible to certain types of irradiation. The ionizing radiation introduced is sufficient to dissolve or otherwise break down the retarder, thus allowing the setting of the cement slurry to proceed. The ionizing radiation also causes bonding between the polymeric additive constituents to create a polymer matrix.

Cement compositions of this invention may include hydraulic cement and a sufficient amount of water to form a slurry, a desired amount of a retarder and a polymeric additive. The retarder of the invention may be a sensitized retarder as disclosed herein, such as a boronated retarder. The sensitized retarder and polymeric additive of the invention are susceptible to certain types of irradiation. The ionizing radiation introduced is sufficient to dissolve or otherwise break down the retarder, thus allowing the setting of the cement slurry to proceed. The ionizing radiation also causes bonding between the polymeric additive constituents to create a polymer matrix.

The types and level of the ionizing radiation used in the methods of this invention may depend upon the type of sensitized retarder used. The types and level of the ionizing radiation used may be dependent upon what is capable of altering or destroying the molecules of the sensitized retarder. In an embodiment, the ionizing radiation source is a high-flux neutron source. In more specific embodiment, the high-flux neutron source is selected from the group consisting of plutonium-beryllium, americium-beryllium, and americium-lithium. Optionally, the high flux neutron source is an accelerator based neutron generator. In an embodiment, the type of ionizing radiation includes alpha rays, beta rays, gamma rays, proton rays, X-rays, or combinations thereof. In an optional embodiment, the amount of ionizing radiation required to alter or destroy the molecules of the sensitized retarder is less than about 500 KiloGrays. In embodiments the sensitizer can also be a scintillator material.

Methods of this invention for cementing a wellbore may include the steps of forming a cement composition including hydraulic cement and a sufficient amount of water to form a slurry, adding to the slurry a desired amount of a set retarder either conventional or sensitized, an accelerator and/or oxidizing agent, and a polymeric additive, pumping the slurry containing the retarder and the accelerator into a wellbore, and subjecting the slurry to ionizing irradiation after placement of the slurry into the wellbore. The accelerator and/or oxidizing agent of the invention may be combined with a polymeric component. The polymeric component serves to prevent the release of the accelerator and/or oxidizing agent into the cement slurry. The set retarder, polymeric component, and polymeric additive are susceptible to certain types of irradiation. The ionizing radiation introduced is sufficient to dissolve, degrade, or otherwise break down the polymeric component, thus allowing the accelerator to be released into the cement slurry. Once the accelerator and/or oxidizing agent is released, it can disperse into the cement slurry and react with the slurry or the retarder, resulting in the initiation of the setting process. The ionizing radiation introduced is also sufficient to dissolve or otherwise break down the retarder, thus allowing the setting of the cement slurry to proceed. The ionizing radiation also causes bonding between the polymeric additive constituents to create a polymer matrix. The release of the ionizing radiation, which is under the control of technicians in the field, thus acts as a trigger in initiating the setting of the cement slurry by releasing the accelerator and sufficiently altering or destroying the retarder.

Cement compositions of this invention may include hydraulic cement and a sufficient amount of water to form a slurry, a desired amount of a set retarder either conventional or sensitized, an accelerator and/or oxidizing agent, and a polymeric additive. The accelerator and/or oxidizing agent of the invention may be combined with a polymeric component. The polymeric component serves to prevent the release of the accelerator and/or oxidizing agent into the cement slurry. The set retarder, polymeric component, and polymeric additive are susceptible to certain types of irradiation. Upon placement in the wellbore, the cement composition may be exposed to ionizing radiation sufficient to dissolve, degrade, or otherwise break down the polymeric component, thus allowing the accelerator to be released into the cement slurry. Once the accelerator and/or oxidizing agent is released, it can disperse into the cement slurry and react with the slurry or the retarder, resulting in the initiation of the setting process. The ionizing radiation introduced is also sufficient to dissolve or otherwise break down the retarder, thus allowing the setting of the cement slurry to proceed. The ionizing radiation also causes bonding between the polymeric additive constituents to create a polymer matrix. The release of the ionizing radiation, which is under the control of technicians in the field, thus acts as a trigger in initiating the setting of the cement slurry by releasing the accelerator and sufficiently altering or destroying the retarder.

The fluid or slurry compositions and methods of using them in the present invention can further include a scintillator material. The scintillator material can act to increase capture efficiency of the ionizing radiation and/or can emit ionizing radiation, or non-ionizing radiation, upon exposure to the ionizing radiation. A scintillator material having the property of fluorescence can emit radiation, which can be referred to as secondary radiation, as the result of absorption of radiation from another source. For example a scintillator material may emit gamma rays, X-rays, or UV radiation upon exposure to neutrons or gamma rays. This secondary radiation can be used to provide radiation to promote the degradation of the polymer and/or the release of the accelerator into the fluid or slurry. If the secondary radiation includes photons or particles with the same wavelength as that of the absorbed radiation, it can be referred to as resonance radiation.

A variety of neutron scintillators are known, a non-limiting list includes LiF/ZnS:Ag, Li-glass, and LiI:Eu. LiF/ZnS:Ag is shown to produce a very large neutron multiplication factor and has been measured at 160,000 photons per neutron absorbed with the majority of the emission occurring below about 450 nm. Li-glasses typically have an emission maximum below about 400 nm.

A variety of gamma ray scintillators are known, a non-limiting list includes NaI:Tl$^+$, Bi$_4$Ge$_3$O$_{12}$(GSO), Gd$_2$SiO$_5$:Ce$^{3+}$, ZnS:Ag. Alkali halides include CsI and NaI. Typical emission maxima observed for some scintillators are: CsI—about 300 nm; BaF$_2$—about 190 to about 305 nm; CaF$_2$:Eu—about 410 nm; GSO:Ce—about 420 nm; YAl:CaTiO$_3$:Ce—about 350 nm.

Organic scintillators can include Ultima Gold XR from Perkin Elmer (aqueous compatible), EJ-301, EJ-305 from Eljen Technologies (compatible with non aqueous solutions).

The scintillator may be used in a powder or crystal form or with a coating such as a polymer. Advantages of incorporating scintillators into the fluid or slurry of the present invention can include the local creation of secondary radiation that can minimize the impact from the well casing or other environmental influences. Potentially large multiplication factors are possible, for example some scintillators will emit more than 10,000 photons for each absorbed ionizing radiation particle/photon. The photons produced by scintillators can be in the X-ray and UV spectral regions that can be highly absorbed by the polymeric component of the slurry. Since these photons are created locally by the scintillation their emission may increase the efficiency of the polymer encapsulation degradation. More photons above the threshold for radical generation from the polymer can increase the rate of either cross-linking or polymer degradation via chain scission, or both simultaneously, depending on polymer chemistry. This process can speed the thickening of the cement slurry and enhance the set-on-command behavior.

The scintillator material may be added to the wellbore treatment fluid or slurry. The scintillator may be incorporated into a polymeric additive. The scintillator material may also be incorporated into a polymeric component that forms an encapsulating layer over particles of an accelerator. The scintillator material may be added to a polymeric component that forms a binder for an accelerator that is formed into a pellet and/or a polymeric component that forms an encapsulating layer over the pellet. The scintillator material can also be a sensitizer material. As used herein the term polymeric additive or polymer additive can include one or more of a polymer or one or more of a polymer precursor such as a monomer or prepolymer intermediate, or combinations thereof.

Various elements can be utilized as a sensitized material. In general, elements having a greater absorption cross-section than the wellbore treatment fluid composition can be used to increase the capture efficiency of the ionizing radiation within the composition. Many wellbore treatment fluid compositions can include calcium, which has an absorption cross-section for 2200 m/s neutrons of about 0.43 barn. A non-limiting listing of elements having an absorption cross-section for 2200 m/s neutrons of 10 barn or greater is shown below in Table 2. A barn is defined as being $10^{-28}$ m$^2$, and corresponds to approximately the cross sectional area of a uranium nucleus.

TABLE 2

Absorption cross section for 2200 m/s neutrons

| Element | Absorption cross section for 2200 m/s neutrons (barn) |
|---------|---------------------------------------------------------|
| Li | 71 |
| B | 767 |
| Cl | 34 |
| Sc | 28 |
| Mn | 13 |
| Co | 37 |
| Se | 12 |
| Kr | 25 |
| Tc | 20 |
| Rh | 145 |
| Ag | 63 |
| Cd | 2,520 |
| In | 194 |
| Xe | 24 |
| Pr | 12 |
| Nd | 51 |
| Pm | 168 |
| Sm | 5,922 |
| Eu | 4,530 |
| Gd | 49,700 |
| Tb | 23 |
| Dy | 994 |
| Ho | 65 |
| Er | 159 |
| Tm | 100 |
| Yb | 35 |
| Lu | 74 |
| Hf | 104 |
| Ta | 21 |
| W | 18 |
| Re | 90 |
| Os | 16 |
| Ir | 425 |
| Pt | 10 |
| Au | 99 |
| Hg | 372 |

In an embodiment, the polymeric additive and the set retarder and/or the accelerator and/or oxidizing agent are added to a cement mixture before water is added to the mixture. In another embodiment, the polymeric additive and the set retarder and/or the accelerator and/or oxidizing agent are added to a cement mixture after water has been added to the mixture. In yet another embodiment, the polymeric additive and the set retarder and/or the accelerator and/or oxidizing agent are added to water that is to be added to a cement mixture. In yet another embodiment, the polymeric additive and the set retarder and/or the accelerator and/or oxidizing agent are added during the mixing of a cement and water. In another embodiment, different polymeric additives and set retarders and/or accelerators and/or oxidizing agents are added at any of the separate times as described above during the preparation of the cement mixture. In yet another embodiment, the accelerator is added before the set retarder and polymeric additive.

In an embodiment, once the cementitious composition containing the polymeric additive and the set retarder and/or accelerator and/or oxidizing agent is obtained, the mixture is then placed in the wellbore, such as in a wellbore/casing annulus. Upon the placement of the cement mixture containing the polymeric component and the set retarder and/or accelerator and/or oxidizing agent in the wellbore, the cement particles would be in intimate contact with one another and the set retarder and/or accelerating and/or oxidizing agent in a substantially uniform mixture. The absorbed polymer chains of neighboring particles should also be intermixed with the cement particles and set retarders and/or accelerating agent.

In a further embodiment, a set retarder and polymeric additive as well as both an accelerator and oxidizer are added to the fluid or slurry. Upon being exposed to the ionizing radiation both the accelerator and oxidizer are released. The simultaneous destruction of the retarder by the oxidizer and the acceleration of cement hydration by the accelerator provide rapid set. Furthermore, the ionizing radiation also causes bonding between the polymeric additive constituents to create a polymer matrix.

According to embodiments of the invention, after the intermixed composition is placed in the wellbore, the ionizing radiation is introduced. Ionizing radiation contains subatomic particles or electromagnetic waves that are energetic enough to detach electrons from atoms or molecules, thereby ionizing them. The occurrence of ionization depends on the energy of the intruding individual particles or electromagnetic waves, which must have energies above the ionization threshold (i.e., photoelectric effect). An intense flood of particles or waves may not cause ionization if these particles or waves do not carry enough energy to be ionizing. In an embodiment, the amount of the ionizing radiation introduced into the wellbore is determined by the amount of ionizing radiation required to ionize the monomer, prepolymer or polymer chains of the polymeric additive and to sufficiently alter the polymeric component to enable release of at least a portion of the accelerator and/or oxidizing agent. The ionizing radiation can be emitted from or in the form of charged particles.

In an embodiment, the charged particles include alpha particles, beta particles, or gamma particles, or combinations thereof. In an optional embodiment, the amount of the ionizing radiation required to ionize a polymeric additive constituents is between about 1 KiloGray to about 500 KiloGray, optionally between about 1 KiloGray to about 100 KiloGray, optionally between about 4 KiloGray to about 40 KiloGray. The amount of ionizing radiation emitted is determined by the level of crosslinking desired and the type of polymer added to the cement mixture. As described above, the amount of ionizing radiation required to alter or destroy the molecules of the sensitizer retarder, including a scintillator is less than about 500 KiloGrays. The fluid or slurry can further include at least one scintillator material capable of emitting secondary radiation upon exposure to the ionizing radiation. In embodiments the scintillator material is capable of reducing the ionizing radiation required. In an embodiment the scintillator material is capable of reducing the ionizing radiation required to less than half that is required without the scintillator material.

In an embodiment, the ionizing radiation is introduced by an ionizing radiation emitter located at a point within the wellbore. In another embodiment, an ionizing radiation emitter located at the surface introduces the ionizing radiation directed downward into the wellbore. In another embodiment, a radiation source is lowered into the wellbore, such as on a wireline, and the ionizing radiation is emitted. The radiation source can be shielded to not emit radiation other than when the shielding is removed. For example, a radiation source can be shielded at the surface when personnel could otherwise be exposed. Once the radiation source is placed in the wellbore and the ionizing radiation can safely be emitted, the shield can be removed or opened, such as by an electronically activated signal transmitted from the surface down the wireline to the shield. In an embodiment the radiation emitter can emit ionizing radiation as it is lowered down the wellbore and as it is pulled up the length of the wellbore. In a further embodiment, two or more radiation emitters are separately lowered to two or more depths, such that two or more depths of the wellbore may be subject to the ionizing radiation simultaneously.

In an embodiment, the ionizing radiation is introduced under the control of a technician in the field. The technician, engineer, or other on-site employee, can have the control over the emission of ionizing radiation by inputting a signal that causes a release of ionizing radiation from an emitter. In this embodiment, the ionizing radiation is released on demand from the technician in the field. The ionizing radiation can be released by a control system having parameters such as timer, flow meter, temperature sensor, or the like. In another embodiment, the lowering and/or emitting of the ionizing radiation source is triggered by a timing mechanism. In a further embodiment, the lowering and/or emitting of the ionizing radiation source is triggered by a flow meter that detects the amount of the intermixed composition delivered into the wellbore.

Upon the introduction of the ionizing radiation, a network of crosslinks between polymeric additive chains can be created. This can be a result of the ionizing radiation on the polymeric additive chain and from the effects of the ionizing radiation on other compounds present such as water and solvents. Radiation, such as alpha radiation, can also initiate the dissociation of molecules, which can be referred to as radiolysis. In one embodiment the radiolysis of water can generate hydroxide radicals, which can abstract hydrogen from the polymeric chains, and thereby form a polymer radical. The polymer radicals can combine through intermolecular and/or intramolecular crosslinking and produce a gelled state. The radiolysis of other compounds such as solvents (solvent radiolysis) can generate intermediates that also can react with the polymeric additive chain. Such a network of crosslinks increases the mechanical strength of the intermixed composition, for example a cement composite prior to the typical cement hydration setting.

In an embodiment, the radiolysis of water and subsequent generation of hydroxyl radicals is increased by the addition of a radiocatalytic material. The radiocatalytic material, when exposed to ionizing radiation, enhances the production of hydroxyl radicals through increased radiolysis of the water present in the composition. The hydroxyl radicals can abstract hydrogen from the polymeric chains, and thereby form a polymer radical. The polymer radicals can combine through intermolecular and/or intramolecular crosslinking to produce a gelation of the polymer chains. The incorporation of radiocatalysts into the cement slurry compositions can enhance water radiolysis within the composition upon exposure to ionizing radiation, thereby reducing the radiation dosage needed to enable crosslinking and the resulting increase in mechanical strength of the sealant composition.

A non-limiting listing of materials that can function as a radiocatalyst are the metal oxides such as $TiO_2$, $SiO_2$, $AlO_2$, $CeO_2$, $ZeO_2$, BeO, and combinations thereof. In an embodiment the radiocatalyst can be a nanoparticle, or optionally can vary in size from nanometers to tens of microns in diameter.

The catalytic effect of radiocatalysts can be enhanced by the presence of suitable sensitizers, such as stannous chloride (also known as tin(II) chloride or tin dichloride). Stannous chloride can catalyze the crosslinking of the polymers in solution under ionizing radiation conditions. The sensitizer can include other tin based materials such as stannous sulfate. The sensitizing effect of tin(II) salts can be increased in the presence of metal oxides. Non-limiting examples of metal oxides that can be used include $Al_2O_3$; $CeO_2$; ZnO; BeO;

NiO; SiO$_2$, and combinations thereof. These metal oxides can be in various forms, such as the case for silica, these could be amorphous silica, colloidal silica, silica fume, or surface treated silica particles. The metal oxides can also be provided by fly ash, which can also provide later age strengths due to pozzolanic activity. Examples of compositions incorporating the sensitizers are given in Example 9.

Molecular oxygen is an effective scavenger of free radicals, such as those created by the radiolysis of water. The presence of molecular oxygen in the slurry can therefore inhibit the radiation induced crosslinking that is desired. During radiation, the polymer macroradicals can react with the oxygen to form corresponding peroxy radials. These peroxy radicals are generally unreactive and thus inhibit further crosslinking. The incorporation of an oxygen scavenger and/or an antioxidant into the slurry can inhibit the formation of the peroxy radicals and thereby assist in the radiation induced crosslinking of the polymeric additive. Non-limiting examples of an oxygen scavenger that can be used in the present invention include: stannous salts such as SnCl$_2$ and SnSO$_4$; tetrakis (hydroxymethyl)phosphonium chloride; tetrakis (hydroxymethyl)phosphonium sulfate; sodium formaldehyde sulfoxyalte; thiourea dioxide; sodium diothionite; sodium hydroxymethanesulfinate hydrate; sodium hydrosulfite (sodium dithionite); formamidinesulfinic acid (thiourea dioxide); and combinations thereof.

The modification of mechanical strength of the fluid, slurry or composite depends upon the level of crosslinking. Low crosslink densities can raise the viscosity of the composition to a gum-like consistency and high crosslink densities can cause the composition to become rigid. In one embodiment, the ionizing radiation is introduced such that a low level of crosslinking is achieved, followed by another introduction of the ionizing radiation such that a higher level of crosslinking is ultimately achieved. The increase in the mechanical strength of a cement composite prior to the typical cement hydration setting can enable the resumption of activities at an earlier time as compared to having to wait on the cement hydration setting.

In an embodiment, wherein the polymeric additive is a polycarboxylate superplasticizer, the ionizing radiation can be used to crosslink neighboring polymeric chains in the aqueous medium. In this embodiment, particles are separated by the steric hindrance caused by anchored polymeric chains, which results in very few crosslinks being required to create a continuous crosslinked network resulting in increased strength. This effect can be further enhanced by adding agents in the aqueous phase that can increase the density of potential reactants in the vicinity of the particles and improve the kinetics of the radiation-enhanced setting process of the current invention without otherwise affecting the properties of the fluid, slurry or composite such as a cement composition.

The ionizing radiation of the current invention can destroy molecules in addition to causing crosslinking. For example, the destruction of polymeric chains and the chemical retarders used to inhibit setting may also serve to reduce fluidity in the cement phase. The destruction of polymeric chains may cause, but is not limited to causing, release of encapsulated accelerating and/or oxidizing agents. This destruction of polymeric chains and chemical retarders may also enhance the increase in the mechanical strength of the process. Rather than being problematic, this result of the invention can serve to improve the performance of the "set on command" aspect of the current invention.

In an embodiment, the cementitious compositions disclosed herein can also contain a water-soluble crosslinking agent to facilitate the reaction between two polymer chains. In an embodiment, the water-soluble crosslinking agent is a lower molecular weight species having good mobility in the aqueous phase and high reactivity towards the free radicals that are created by the ionizing radiation of the polymeric additive. In an embodiment, the water-soluble crosslinking agent is a water-soluble polymer. In another embodiment, the water-soluble crosslinking agent is a high molecular weight water-soluble polysaccharide. In an embodiment, the water-soluble crosslinking agent is selected from the group consisting of ethylene glycol, diethylene glycol, propylene glycol, polyalkyleneoxides such as polyethyleneoxide, polyvinyl alcohol, and polycarboxylic acids such as polyacrylic acid, citric acid, butanetetracarboxylic acid and the like.

Multifunctional crosslinkers include poly (ethylene glycol) diacrylates, poly(ethylene glycol) dimethacrylates, trimethylolpropane triacrylate (TMPTA), ethoxylated TMPTA, trimethylolpropane trimethacrylate, trimethylolpropanetriacrylate, hexanediol diacrylate, N,N-methylene bisacrylamide, hexanedioldivinylether, triethyleneglycol diacrylate, pentaeritritoltriacrylate, tripropyleneglycol diacrylate, 1,3,5-Triallyl-1,3,5-triazine-2,4,6(1H,3H,5H)-trione, 2,4,6Trially-loxy-1,3,5-triazine, alkoxylated bisphenol A diacrylate, the like, and mixtures thereof.

As mentioned above, the ionizing radiation of the current invention can be under the control of technicians in the field. In an embodiment the ionizing radiation emissions can induce a preliminary increase in mechanical strength of the cement composite prior to the hydration setting of the cement. The release of the ionizing radiation emissions can act as a trigger in the sense that the radiation can destroy the sensitized retarder, thus allowing the setting of the cement slurry to proceed. The release of ionizing radiation may also act as a trigger when the ionizing radiation emissions act to degrade the polymeric component of the accelerator and/or oxidizing agent, thus releasing the accelerator and/or oxidizing agent, or both, into the cement slurry. Once the accelerator and/or oxidizing agent is released, it is dispersed into the cement slurry and reacts with the slurry or retarder, resulting in the acceleration of the setting process. Therefore, the increase in mechanical strength of the concrete composition of the invention is under the control of technicians in the field. Such control can result in a decrease in the time needed to wait on cement (WOC) in the drilling and completion of a wellbore. In an embodiment, the WOC time of the cement composition of the invention containing an ionizing a radiation reactive polymeric additive is less than the WOC time of a substantially similar cement composition not containing the polymeric additive. In embodiments the inventive cement composition reduces the WOC time by at least an hour, at least two hours, at least five hours, or at least 10 hours as compared to a substantially similar cement composition not containing the polymeric additive.

EXAMPLES

Example 1

800 grams of a Class H cement was mixed with 320 mL of water (to give a water-to-cement, w/c, ratio of 0.40) and 0.5% bwoc of a 900,000 MW PEO (polyethylene oxide) to form a slurry. The slurry also contained 0.50% bwoc maltrodextrin, a cement set retarder. The slurry was mixed for 45 seconds in a Waring blade mixer at high shear. The slurry was split into two samples. One sample was exposed to 4.3 Mrads of gamma radiation exposure from a Co-60 source while the other was kept as the control. The control sample, that was not irradiated was still fluid (yield point measured at 3.5 Pa) whereas the gamma-irradiated sample had cross-linked and was totally solid.

Example 2

Several slurries were prepared using a Class H cement, water (to give a water-to-cement, w/c, ratio of 0.40) with two different PEOs (100,000 MW and 900,000 MW). Other components in the slurries were a polycarboxylate ether (dispersant), Diutan gum (viscosity modifier) and maltodextrin (retarder). The mix-designs for the slurries are given in Table 3.

TABLE 3

Mix designs for the slurries used in cross-linking experiments.

| | | Mix Design | | | | | |
|---|---|---|---|---|---|---|---|
| | | MIX #1 | MIX #2 | MIX #3 | MIX #4 | MIX #5 | MIX #6 |
| Cement | grams | 800 | 800 | 800 | 800 | 800 | 800 |
| water | grams | 316.4 | 316.4 | 320 | 320 | 320 | 320 |
| Retarder (Maltodextrin) | grams | 4 | 4 | 4 | 4 | 4 | 4 |
| Dispersant Name | | ADVA 575 | ADVA 575 | Melflux 1641 | Melflux 1641 | Melflux 2651 | Melflux 2651 |
| Disperant Total Solids | | 0.40 | 0.40 | 1.00 | 1.00 | 1.00 | 1.00 |
| Dispersant | grams | 6 | 6 | 2.4 | 2.4 | 2.4 | 2.4 |
| VMA (Diutan Gum) | grams | 3.2 | 3.2 | 3.2 | 3.2 | 3.2 | 3.2 |
| PEO MW | | 100,000 | 900,000 | 100,000 | 900,000 | 100,000 | 900,000 |
| PEO | grams | 4 | 4 | 4 | 4 | 4 | 4 |

All of the slurries were exposed to 4.3 Mrads of gamma radiation from a Co-60 source and were found to cross-link and gel on exposure to gamma radiation while non-radiated controls were still fluid. The yield points for the controls were determined using a FANN® 35 viscometer and are shown in Table 4. No such measurements were possible on the gelled samples.

TABLE 4

Yield point measurements of the controls for the cross-linking experiments.

| Mix ID | Yield Point (Pa) |
|---|---|
| 1 | 92 |
| 2 | 94 |
| 3 | 110 |
| 4 | 96 |
| 5 | 110 |
| 6 | 122 |

Example 3

800 grams of a Class H cement was mixed with 320 mL of water (w/c=0.40) and 0.5% bwoc of a 360,000 MW poly (vinyl pyrrolidone) to form a slurry. The slurry also contained 0.50% bwoc maltodextrin, a cement set retarder. The slurry was mixed for 45 seconds in a Waring blade mixer at high shear. The slurry was split into two samples. One sample was exposed to 4.3 Mrads of gamma radiation exposure from a Co-60 source while the other was kept as the control. The control sample that was not irradiated was still fluid, with a yield point measured at 150 Pa, whereas the gamma-irradiated sample had cross-linked and was totally solid.

Example 4

800 grams of a Class H cement was mixed with 320 mL of water (w/c=0.40) and 0.5% bwoc of a 900,000 MW PEO (polyethylene oxide) to form a slurry. The slurry also contained 0.50% bwoc maltrodextrin, a cement set retarder. The slurry was mixed for 45 seconds in a Waring blade mixer at high shear. The slurries were exposed to gamma radiation dose ranging from 0.4 Mrad to 2.5 Mrad. All the slurry samples exposed to gamma radiation resulted in gelling of the samples whereas the control samples remained fluid with a yield point of 36 Pa.

Figure 2:
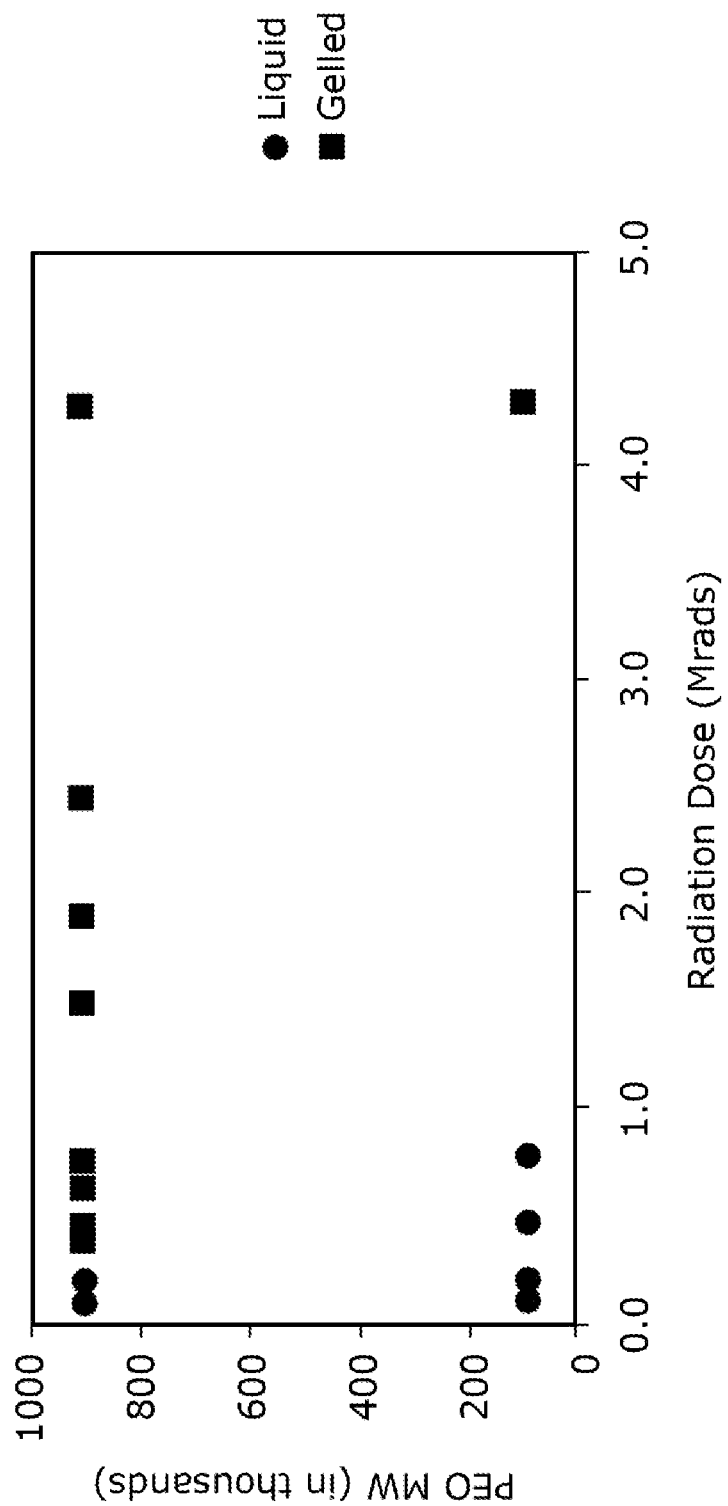
FIG. 2 is a graph of results from a radiation dose study.
Figure 3:
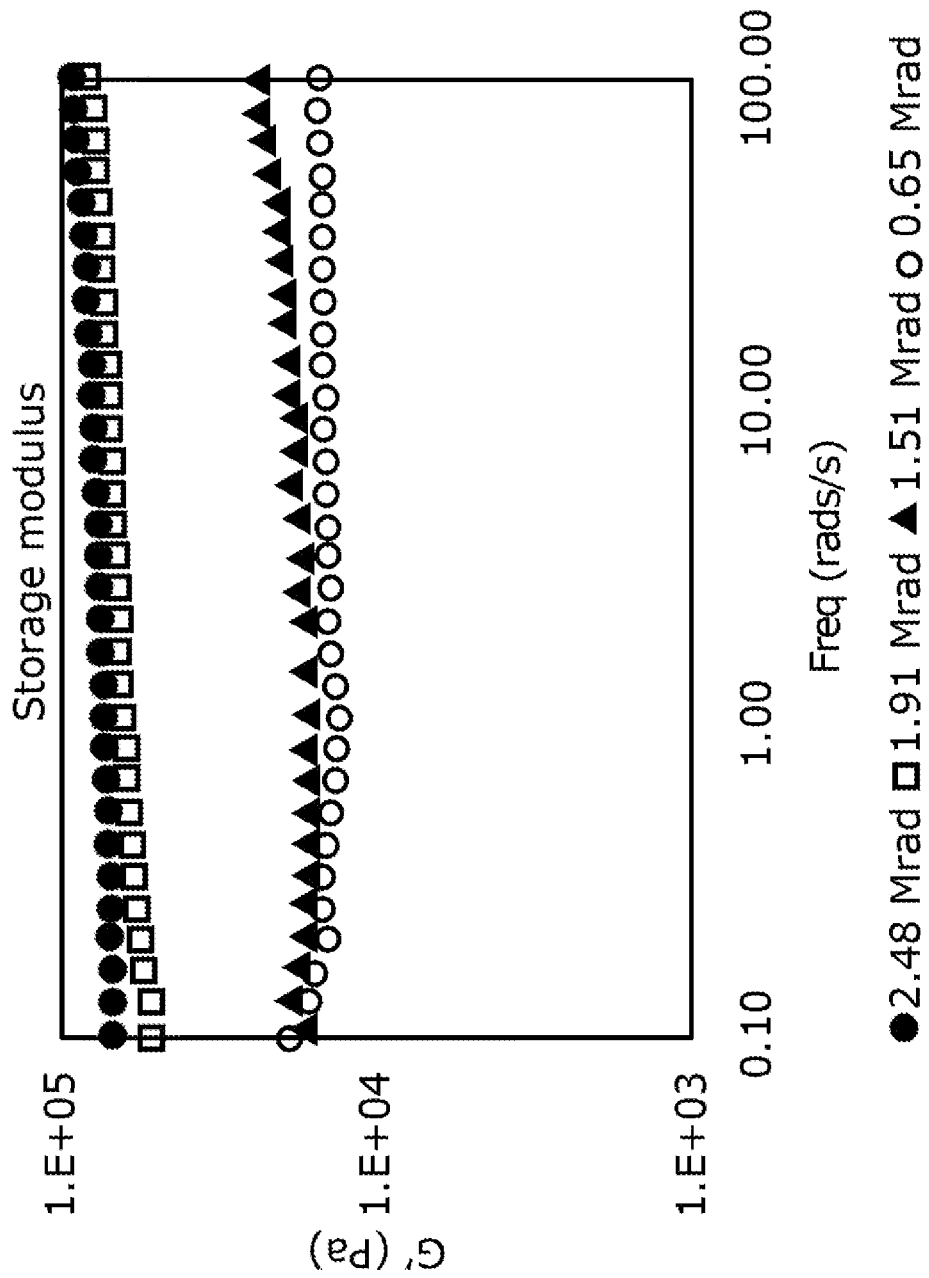
FIG. 3 is a graph of Storage Modulus values from a radiation dose study.
Figure 4:
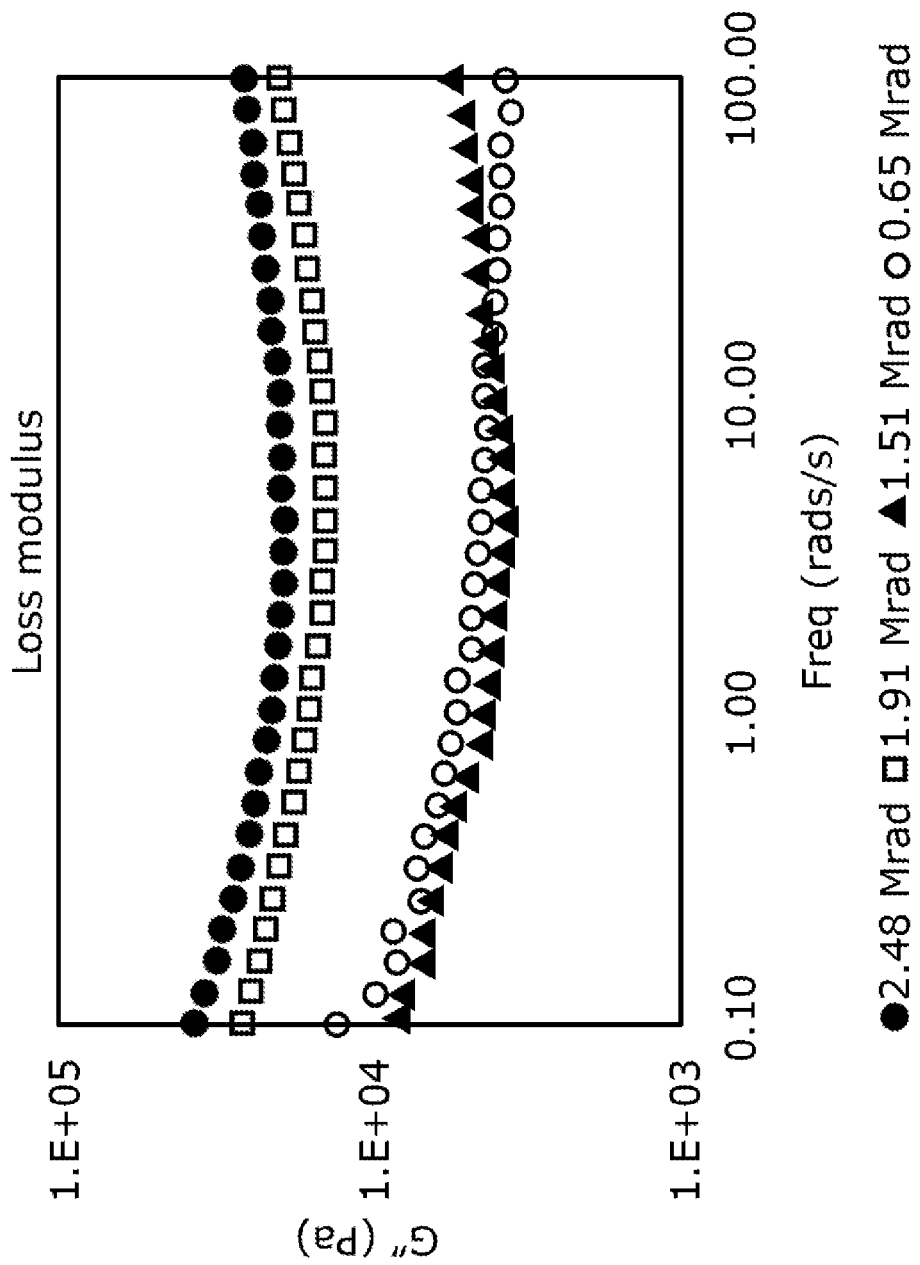
FIG. 4 is a graph of Loss Modulus values from a radiation dose study.

FIG. 2 illustrates the results of the dose response study in PEO of differing radiation exposure. FIGS. 3 and 4 illustrate the results of the dose response study in PEO of differing radiation exposure and the resulting effect on Storage Modulus and Loss Modulus. The modulus values increased with radiation dosage.

Example 5

Aqueous solutions of PEO and Polycarboxylates were irradiated with 4.3 Mrads of gamma-radiation. The observations were as shown in Table 5.

TABLE 5

| Sample ID | Sample | Effect of Radiation |
|---|---|---|
| 1 | 2% solution of 100,000 MW PEO | Cross-links |
| 2 | 5% solution of 100,000 MW PEO | Cross-links |
| 3 | 2% solution of 900,000 MW PEO | Cross-links |
| 4 | 5% solution of 900,000 MW PEO | Cross-links |
| 5 | 10% solution of ADVA 575 | No crosslinking |
| 6 | 10% solution of Melflux 1641 | No crosslinking |
| 7 | 10% solution of Melflux 2651 | No crosslinking |

Example 6

Two cement slurry samples were prepared by mixing: 150 grams of class H cement; 60 grams of water (w/c=0.40); 1.0% bwoc of a 900,000 MW PEO (polyethylene oxide); 0.50% bwoc of maltodextrin (set retarder); 0.50% bwoc of HR-25 (set retarder); 0.50% bwoc of diutan gum (rheology modifier). The slurry was mixed for 45 seconds on a Waring blade mixer as per the API mixing schedule. Mix #1 was used as a control having no oxygen scavenger, while mix #2 contained an oxygen scavenger (SnCl2) at a concentration of 0.14% bwoc. Each mix was split into two set of vials. One set of vials from each mix was exposed to neutron irradiation at a flux of $1 \times 10^{11}$ n/cm$^2$/sec for 2 minutes while the other set of vials was kept as control. Exposure of the vials to neutron irradiation causes the cement to set. Gel strength measurements were taken on the samples using the back-extrusion rheological device and the results are listed in Table 5.

TABLE 5

| Mix # | O$_2$ Scavenger | Concentration (% bwoc) | Relative Gel Strength (psi) |
|---|---|---|---|
| 1 | None | 0.00 | 17.5 |
| 2 | SnCl$_2$ | 0.14 | 58.5 |

Example 7

Cement slurries were prepared using the procedure as in Example 6. Acrylamide (8% bwoc) and N,N'-methylene bis acrylamide (0.5% bwoc) were used as the polymeric components in place of the PEO. These slurries were exposed to neutron radiation at a flux of 1×10$^7$ n/cm$^2$/sec for 20 minutes while the other set of vials was kept as control. Several different oxygen scavengers were evaluated and the results are tabulated in Table 6.

TABLE 6

| O$_2$ Scavenger | Concentration (% bwoc) | Relative Gel Strength (psi) |
|---|---|---|
| None | | 11.2 |
| SnCl$_2$ | 0.100 | 297.4 |
| SnCl$_2$ | 0.200 | 380.1 |
| SnSO$_4$ | 0.113 | 222.1 |
| SnSO$_4$ | 0.226 | 146.1 |

Example 8

Cement slurries were prepared using the procedure as in Example 6. Acrylamide (8% bwoc) and N,N'-methylene bis acrylamide (0.5% bwoc) were used as the polymeric components in place of the PEO. These slurries were exposed to neutron radiation at a flux of 1×10$^7$ n/cm$^2$/sec for 20 minutes while the other set of vials was kept as control. Several different oxygen scavengers were evaluated and the results are tabulated in Table 7.

TABLE 7

| O$_2$ Scavenger | Concentration (% bwoc) | Relative Gel Strength (psi) |
|---|---|---|
| None | | 109.9 |
| SnCl$_2$ | 0.100 | 385.7 |
| Tetrakis hydroxyl phosphonium chloride | 0.100 | 443.9 |
| Sodium formaldehyde sulfoxyalte | 0.100 | 402.4 |
| Thiourea Dioxide | 0.100 | 316.1 |
| Sodium diothionite | 0.100 | 178.3 |

Example 9

Two cement slurry samples were prepared by mixing: 200 grams of class H cement; 80 grams of water (w/c=0.40); 4.0% bwoc acrylamide; 4.0% bwoc of N-vinyl-pyrrolidone; 0.42% bwoc N,N'-methylene bis acrylamide (crosslinker); 0.50% bwoc of maltodextrin (set retarder); 0.50% bwoc of HR-25 (set retarder); 0.20% bwoc of diutan gum (rheology modifier); 2.0% bwoc of SYLOID 900W (silica gel available commercially from W.R. Grace & Co.). The slurry was mixed for 45 seconds on a Waring blade mixer as per the API mixing schedule. Mix #1 was used as a control having no sensitizer, while mix #2 contained sensitizer (SnCl$_2$) at a concentration of 0.10% bwoc. Each mix was split into two set of vials. One set of vials from each mix was exposed to gamma radiation from a Co-60 source for 0-60 Gy, while the other set of vials was kept as control. Exposure of the vials to gamma radiation causes the cement to set. Gel strength measurements were taken on the samples using the back-extrusion rheological device and the results are listed in Table 8. The addition of the sensitizer made a significant difference in the gel strength attained.

TABLE 8

| Mix # | Sensitizer | Concentration (% bwoc) | Radiation Dose (Gy) | BER Gel Strength (psi) |
|---|---|---|---|---|
| 1 | None | 0.0 | 0 | 0.1 |
| 1 | None | 0.0 | 30 | 0.3 |
| 1 | None | 0.0 | 60 | 3.3 |
| 2 | SnCl$_2$ | 0.1 | 0 | 0.6 |
| 2 | SnCl$_2$ | 0.1 | 30 | 80.6 |
| 2 | SnCl$_2$ | 0.1 | 60 | 199.4 |

Example 10

Cement slurries were prepared using the procedure described in Example 9. Acrylamide (8% bwoc) and N,N'-methylene bis acrylamide (0.5% bwoc) were used as the polymeric components. SYLOID Silica RAD 2005, having a surface treated with 20% organics was used instead of SYLOID 900W, both commercially available from W.R. Grace & Co. The mixes were treated and tested as in Example 9, the results shown in Table 9.

TABLE 9

| Mix # | Sensitizer | Concentration (% bwoc) | Radiation Dose (Gy) | BER Gel Strength (psi) |
|---|---|---|---|---|
| 1 | None | 0.0 | 0 | 0.0 |
| 1 | None | 0.0 | 30 | 0.0 |
| 1 | None | 0.0 | 60 | 0.0 |
| 2 | SnCl$_2$ | 0.1 | 0 | 0.7 |
| 2 | SnCl$_2$ | 0.1 | 30 | 147.1 |
| 2 | SnCl$_2$ | 0.1 | 60 | 325.7 |

Example 11

Two silica flour samples were prepared by mixing: 200 grams of silica flour; 66 grams of 0.18% Ca(OH)2 solution; 4.0% bwoc acrylamide; 4.0% bwoc of N-vinyl-pyrrolidone; 0.42% bwoc N,N'-methylene bis acrylamide (crosslinker); 0.50% bwoc of maltodextrin (set retarder); 0.20% bwoc of diutan gum (rheology modifier). The slurry was mixed for 45 seconds on a Waring blade mixer as per the API mixing schedule. Mix #1 was used as a control having no sensitizer, while mix #2 contained sensitizer (SnCl$_2$) at a concentration of 0.10% bwoc. Each mix was split into two set of vials. One set of vials from each mix was exposed to gamma radiation from a Co-60 source for 0-60 Gy, while the other set of vials was kept as control. Exposure of the vials to gamma radiation causes the cement to set. Gel strength measurements were taken on the samples using the back-extrusion rheological device and the results are listed in Table 10. The addition of the sensitizer made a significant difference in the gel strength attained.

TABLE 10

| Mix # | Sensitizer | Concentration (% bwoc) | Radiation Dose (Gy) | BER Gel Strength (psi) |
|---|---|---|---|---|
| 1 | None | 0.0 | 0 | 0.0 |
| 1 | None | 0.0 | 30 | 0.0 |
| 1 | None | 0.0 | 60 | 0.0 |
| 2 | $SnCl_2$ | 0.1 | 0 | 0.6 |
| 2 | $SnCl_2$ | 0.1 | 30 | 37.5 |
| 2 | $SnCl_2$ | 0.1 | 60 | 87.1 |

Example 12

Two slurry samples were prepared by mixing the following: Mix 1 had 325 grams of class H cement; 130 grams of water (w/c=0.40); 0.50% bwoc of maltodextrin (set retarder) and 0.50% bwoc of HR-25 (set retarder). Mix 2 had 325 grams of silica flour; and 143 grams of 0.18% $Ca(OH)_2$ solution water (w/c=0.44, to provide alkaline media). To each of the mixes the following were added: 8.0% bwoc acrylamide; 0.50% bwoc N,N'-methylene bis acrylamide (crosslinker); 0.20% bwoc of diutan gum (rheology modifier) and 0.10% bwoc $SnCl_2$ (sensitizer).

The two slurries were prepared at different solids ratio to keep the rheology of the two slurries similar. The slurries were mixed for 45 seconds on a Waring blade mixer as per the API mixing schedule. Each mix was split into two set of vials. One set of vials from each mix was exposed to gamma radiation from a Co-60 source for 0-60 Gy, while the other set of vials was kept as control. Exposure of the vials to gamma radiation causes the cement to set. Gel strength measurements were taken on the samples using the back-extrusion rheological device and the results are listed in Table 11. The addition of the sensitizer made a significant difference in the gel strength attained.

TABLE 11

| Radiation Dose (Gy) | Mix 1 Gel Strength (psi) | Mix 2 Gel Strength (psi) |
|---|---|---|
| 0 | 0.4 | 0.9 |
| 15 | 0.3 | 187.7 |
| 30 | 0.9 | 437.4 |
| 60 | 28.1 | 402 |
| 120 | 111.0 | 704.8 |
| 180 | 213.6 | 596.8 |
| 240 | 300.2 | 627.9 |
| 300 | 312.4 | 652.6 |
| 360 | 266.5 | 686.4 |

Example 13

Four slurry samples were prepared by mixing the different binders at different water:solids ratio to give similar rheology. The recipes for the mixes are given in Table 12.

TABLE 12

| | Mix #1 | Mix #2 | Mix #3 | Mix #4 |
|---|---|---|---|---|
| Binder | Microsand APS = 5 μm | Silica Flour (SSA-1) APS = 17 μm | Cement | Fly Ash:Cement (1:1) |
| Binder amount | 150 | 150 | 150 | 150 |
| w/s | 0.55 | 0.55 | 0.40 | 0.40 |
| Retarder (HR:MD, 1:1) | None | None | 1% bwoc | 1% bwoc |
| Diutan Gum (VMA) | 0.0 | 0.32 | 0.20 | 0.20 |
| Acrylamide | 8.08% bwos | 8.08% bwos | 8.08% bwos | 8.08% bwos |
| Methylene bisacrylamide | 0.43% bwos | 0.43% bwos | 0.43% bwos | 0.43% bwos |
| $SnCl_2$ | 0.10% bwos | 0.10% bwos | 0.10% bwos | 0.10% bwos |

The slurries were prepared at differing water:solids ratio to keep the rheology of the slurries similar. The slurries were mixed for 45 seconds on a Waring blade mixer as per the API mixing schedule. Each mix was split into two set of vials. One set of vials from each mix was exposed to gamma radiation from a Co-60 source for 0-120 Gy, while the other set of vials was kept as control. Exposure of the vials to gamma radiation causes the cement to set. Gel strength measurements were taken on the samples using the back-extrusion rheological device and the results are listed in Table 13.

TABLE 13

| Radiation Dose (Gray) | Mix 1 Gel Strength (psi) | Mix 2 Gel Strength (psi) | Mix 3 Gel Strength (psi) | Mix 4 Gel Strength (psi) |
|---|---|---|---|---|
| 0 | 0.6 | 0.1 | 0.4 | 0.4 |
| 15 | 52.4 | 0.1 | ND | 11.5 |
| 30 | ND | 26 | 0.4 | 79.6 |
| 45 | 183.0 | 72.4 | ND | 113.6 |
| 60 | 238.4 | 86.7 | 19.4 | 166.9 |
| 90 | 320.0 | 163.2 | ND | 185.6 |
| 120 | 446.5 | 258.8 | ND | 284.7 |

ND = No Data

Figure 8:
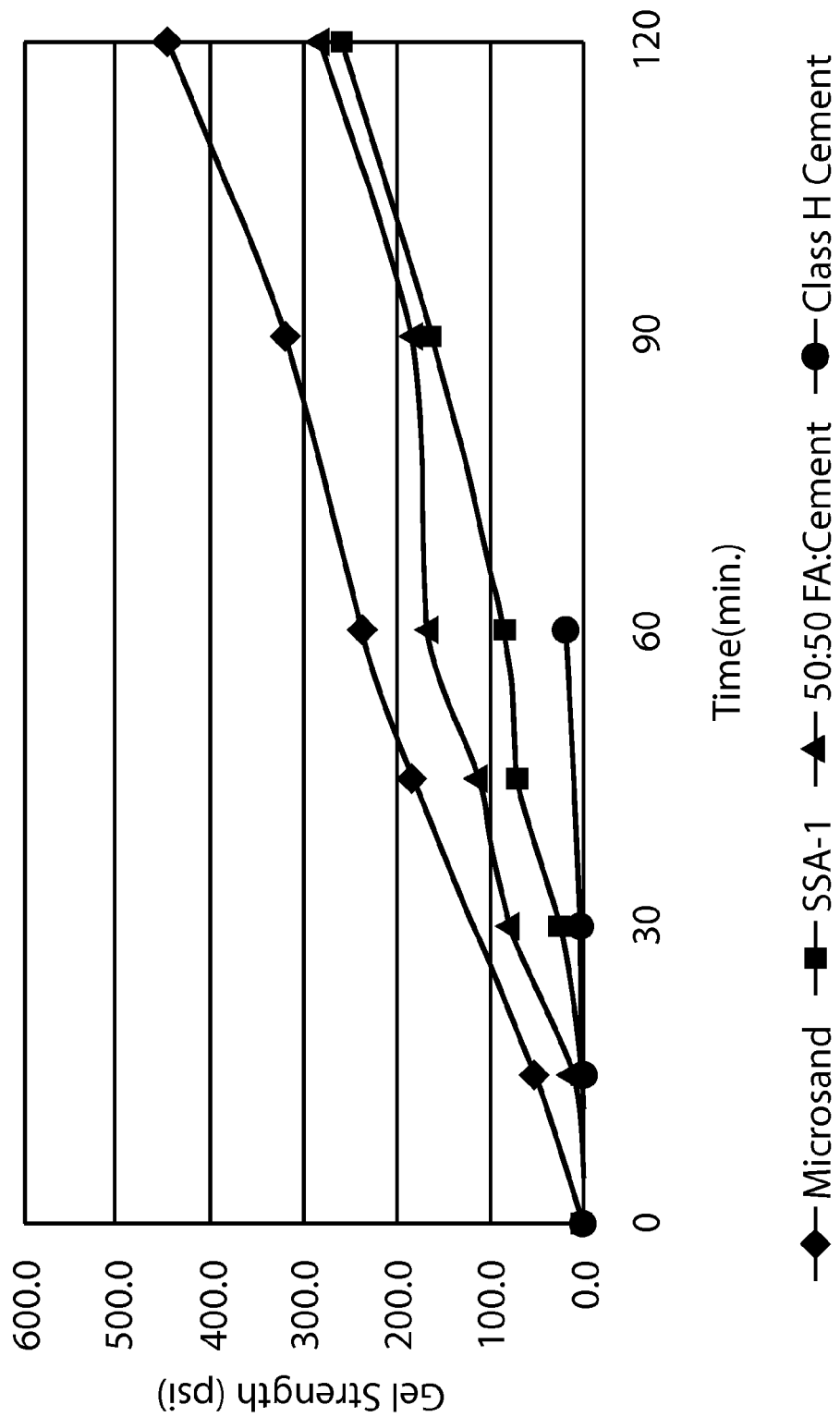
FIG. 8 is a graph of gel strength achieved over time with compositions of the present invention.

The data from Table 13 is shown in FIG. 8.

Example 14

Five polymers were chosen for a comparative test series. The polymers were poly-methyl-methacrylate (PMMA), polyhexylsulfone, cellulose acetate, cellulose acetate butyrate, and polymethylacrylonitrile. The polymers were dissolved in appropriate solvents and thin films were spin-coated onto a glass slide. The thickness of the films ranged from 0.5 μm to 2 μm. The slides were subjected to different treatments as follows: (a) Immersed in saturated $Ca(OH)_2$ solution to test the alkaline stability of the polymer films. This served as the control. (b) Immersed in saturated $Ca(OH)_2$ solution and exposed to neutron radiation. (c) Same as (b) but with $TiO_2$ nanoparticles. (d) Same as (b) but with $TiO_2$ nanoparticles containing $Fe^{3+}$ ions (from Ferric nitrate). Samples (b) through (d) were exposed to neutron irradiation at a flux of $10^{12}$ n/cm$^2$/sec for 20 minutes. The results are tabulated in Table 14.

TABLE 14

| Polymer | Treatment | Appearance |
|---|---|---|
| PMMA | Control | Intact |
| | Irradiated | Intact |
| | Irradiated with $TiO_2$ | Intact |
| | Irradiated with $TiO_2$ + $Fe^{3+}$ | Intact |
| Polyhexylsulfone | Control | Cloudy |
| | Irradiated | Partial Degradation |
| | Irradiated with $TiO_2$ | Partial Degradation |
| | Irradiated with $TiO_2$ + $Fe^{3+}$ | Partial Degradation |

TABLE 14-continued

| Polymer | Treatment | Appearance |
|---|---|---|
| Cellulose Acetate | Control | Intact |
| | Irradiated | Intact |
| | Irradiated with $TiO_2$ | Total Degradation |
| | Irradiated with $TiO_2 + Fe^{3+}$ | Breaks apart under N2 stream during drying |
| Cellulose Acetate Butyrate | Control | Intact |
| | Irradiated | Intact |
| | Irradiated with $TiO_2$ | Film has shrunk |
| | Irradiated with $TiO_2 + Fe^{3+}$ | Partial Degradation |
| Polymethyl-acrylonitrile | Control | Intact |
| | Irradiated | Partial Degradation |
| | Irradiated with $TiO_2$ | Partial Degradation |
| | Irradiated with $TiO_2 + Fe^{3+}$ | Partial Degradation |

The term "accelerator" can include any component, which reduces the setting time of a cement composition. For example, the accelerator may include alkali and alkali earth metal salts, such as a calcium salt. The calcium salt may include calcium formate, calcium nitrate, calcium nitrite or calcium chloride.

The term "cementitious composition" as may be used herein includes pastes (or slurries), mortars, and grouts, such as oil well cementing grouts, shotcrete, and concrete compositions having a hydraulic cement binder. The terms "paste", "mortar" and "concrete" are terms of art: pastes are mixtures composed of a hydratable (or hydraulic) cement binder (usually, but not exclusively, Portland cement, Masonry cement, Mortar cement, and/or gypsum, and may also include limestone, hydrated lime, fly ash, granulated blast furnace slag, and silica fume or other materials commonly included in such cements) and water; "mortars" are pastes additionally including fine aggregate (e.g., sand), and "concretes" are mortars additionally including coarse aggregate (e.g., crushed rock or gravel). The cement compositions described in this invention are formed by mixing required amounts of certain materials, e.g., a hydraulic cement, water, and fine and/or coarse aggregate, as may be required for making a particular cementitious composition.

As used herein, "comb polymers" means those polymers having a main chain backbone and linear side chain pendant groups.

The term "encapsulating layer" as used herein can mean any form of coating or binding wherein most of the material being encapsulated is enclosed within the layer and that the dissipation of the material is substantially restricted by the layer. It does not mean that all of the material being encapsulated is enclosed within the layer or that the material being encapsulated cannot leak through the encapsulating layer.

The term "ionizing radiation" or "radiation" can be referred to as ionization inducing or indirectly ionizing, that are able to detach electrons from atoms or molecules, and can include alpha rays, beta rays, gamma rays, proton rays, neutron radiation, proton rays, UV and X-rays.

The term "oxidizer" or "oxidizing agent" can include any component that is capable of degrading the retarder present. These include, but are not limited to alkaline earth and zinc salts of peroxide, perphosphate, perborate, percarbonate; calcium peroxide, calcium perphosphate, calcium perborate, magnesium peroxide, magnesium perphosphate, zinc perphosphate; calcium hypochlorite, magnesium hypochlorite, chloramine T, trichloroisocyanuric acid, trichloromelamine, dichloroisocynaurate dihydrate, anhydrous dichloroisocynaurate; and mixtures thereof.

As used herein, "polycarboxylate comb superplasticizers" means those cement dispersing polymers and copolymers having a polycarboxylate backbone and polyalkylene oxide groups pendant therefrom, such as polyethylene oxide, polypropylene oxide, etc., and mixtures of the same. Polymers of these general types can be prepared by any suitable manner such as, for example, by copolymerizing unsaturated (alkoxy)polyalkylene glycol mono (meth)acrylic acid or ester type monomers with (meth) acrylic acid type monomers such as are described in U.S. Pat. No. 6,139,623, the disclosure of which is hereby incorporated by reference.

The term "polymeric additive" as may be used herein can include one or more of a polymer or polymer precursor, such as a monomer or a prepolymer intermediate, that is susceptible to ionizing radiation.

The term "radiation tolerance" as used herein is the amount of ionizing radiation that a material can withstand without noticeable or measurable degradation.

The term "retarder" or "set retarder" can include boronated or non-boronated forms of phosphonic acid, phosphonic acid derivatives, lignosulfonates, salts, sugars, carbohydrate compounds, organic acids, carboxymethylated hydroxyethylated celluloses, synthetic co- or ter-polymers including sulfonate and carboxylic acid groups, and/or borate compounds.

The term "set" as used herein refers to an increase in mechanical strength of a wellbore treatment fluid or slurry sufficient to perform a desired result, such as to restrict movement of an item or impede fluid flow or pressure transfer through a fluid. A cement may be referred to as set when it can restrict the movement of a pipe, or impede fluid flow or pressure transfer, regardless of whether the cement has cured to a fully solid composition. A wellbore treatment fluid or slurry can be referred to as set when it has thickened to a sufficient level that it achieves the desired result, such as the isolation of a particular zone or the restriction of fluid flow or pressure transfer, regardless of whether it has reached its final consistency.

The term "wellbore treatment fluid" can be any fluid or slurry suitable for wellbore operations, drilling, completion, workover or production operations such as cements, settable drilling muds, lost circulation fluids, fracturing fluids, conformance fluids, sealants, resins, etc. and combinations thereof.

Depending on the context, all references herein to the "invention" may in some cases refer to certain specific embodiments only. In other cases it may refer to subject matter recited in one or more, but not necessarily all, of the claims. While the foregoing is directed to embodiments, versions and examples of the present invention, which are included to enable a person of ordinary skill in the art to make and use the inventions when the information in this patent is combined with available information and technology, the inventions are not limited to only these particular embodiments, versions and examples. Other and further embodiments, versions and examples of the invention may be devised without departing from the basic scope thereof and the scope thereof is determined by the claims that follow.

While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee.

The invention claimed is:

1. A method of wellbore isolation within a subterranean formation comprising:
   placing a sealant composition comprising a polymeric additive and a set modifier into a wellbore penetrating a subterranean formation; and
   subjecting the sealant composition to ionizing radiation.

2. The method of claim 1, wherein subjecting the sealant composition to the ionizing radiation initiates thickening and setting of the sealant composition.

3. The method of claim 1, wherein the sealant composition contains at least one sensitizer material to increase the sealant composition capture efficiency for the ionizing radiation.

4. The method of claim 3, wherein the sensitizer material comprises a boron compound.

5. The method of claim 1, further comprising:
   preparing a sealant composition comprising the polymeric additive and the set modifier,
   wherein the set modifier is selected from the group consisting of an accelerator, an oxidizing agent, a set retarder, a sensitized retarder, and combinations thereof, and
   wherein subjecting the sealant composition to the ionizing radiation alters the polymeric additive and set modifier.

6. The method of claim 5, wherein subjecting the sealant composition to the ionizing radiation enables the polymeric additive to react with compounds within the sealant composition and enables the set modifier to react to increase the mechanical strength of the sealant composition.

7. The method of claim 6, wherein subjecting the sealant composition to the ionizing radiation enables an oxidizing agent to degrade a retarder and reduce its retarding effect.

8. The method of claim 5, wherein the set modifier further comprises a polymeric component.

9. The method of claim 8, wherein the ionizing radiation causes degradation of the polymeric component, degradation of the set retarder reducing the retarding effect of the set retarder, or a combination thereof.

10. The method of claim 8, wherein the polymeric component is a binder, an encapsulating layer, or a combination thereof, that inhibits release of one or more set modifiers.

11. The method of claim 10, wherein a first polymeric component acts as the binder that is subject to alkaline hydrolysis and a second polymeric component forms an encapsulating layer over the first polymeric component that is resistant to alkaline hydrolysis.

12. The method of claim 8, wherein the polymeric component has a radiation tolerance of from about 1 Gray to about 500 KiloGrays.

13. The method of claim 8, wherein the polymeric component is selected from the group consisting of polyisobutylene, fluoroelastomers, silicon rubber, polyesters, polytetrafluoroethylene, polyacetals, polypropylene, copolymers of polypropylene-ethylene, polymethylpentene, polymethylmethacrylate, fluorinated ethylene propylene, cellulose acetate, polymethylacrylonitrile, polyhexylsulfone, cellulose acetate butyrate, and combinations thereof.

14. The method of claim 1, wherein the polymeric additive is selected from the group consisting of a homopolymer, copolymer, terpolymer, hyperbranched polymer, dendritic polymer, a water-soluble crosslinkable polymer, a comb polymer, and combinations thereof.

15. The method of claim 1, wherein the polymeric additive is selected from the group consisting of a poly(alkyleneoxide), poly(vinyl pyrrolidone), poly(vinyl alcohol), a polyacrylamide, a polyacrylate, poly(vinyl methyl ether), and combinations thereof.

16. The method of claim 1, wherein the ionizing radiation causes bonding between the polymeric additive constituents and creates a polymer matrix within the sealant composition.

17. The method of claim 1, wherein the set modifier comprises an accelerator added in an amount of from about 0.1% to about 20% by weight of the sealant composition.

18. The method of claim 1, wherein the set modifier comprises a set retarder added in an amount from about 0.1% to about 10% by weight of the sealant composition.

19. The method of claim 1, wherein the set modifier comprises an oxidizing agent added in an amount of about 0.05% to about 5% by weight of the sealant composition.

20. The method of claim 1, wherein the polymeric additive is a homopolymer, a copolymer, a terpolymer, a hyperbranched polymer, a dendritic polymer, or a comb polymer containing two or more different chain length polyalkylenoxide pendant groups.

21. The method of claim 1, wherein the polymeric additive is a comb polymer having cement anchoring groups and pendant ionizable dispersing groups.

22. The method of claim 1, wherein the polymeric additive is a water-soluble crosslinkable polymer selected from the group consisting of a poly(alkeneoxide), poly(vinyl pyrrolidone), poly(vinyl alcohol), a polyacrylamide, a polyacrylate, poly(vinyl methyl ether), and combinations thereof.

23. The method of claim 1, wherein the sealant composition comprises one or more components selected from the group consisting of a resin, a cement, a settable drilling mud, a lost circulation fluid, a conformance fluid, and combinations thereof.

24. The method of claim 1, wherein the ionizing radiation is selected from the group consisting of alpha rays, beta rays, gamma rays, neutron rays, proton rays, UV rays, X-rays, and combinations thereof.

25. The method of claim 1, wherein the sealant composition further comprises at least one scintillator material capable of emitting secondary radiation upon exposure to the ionizing radiation.

26. The method of claim 25, wherein the scintillator material is selected from the group consisting of LiF/ZnS:Ag, Li-glass, LiI:EU, NaI:T1$^+$, BiGeO$_{12}$(GSO), GdSiO:Ce$^{3+}$; ZnS:Ag, CsI, NaI, BaF$_2$, BaF$_2$:Eu, GSO:Ce, YA1:CaTiO$_3$:Ce, and combinations thereof.

27. The method of claim 1, wherein the ionizing radiation is emitted from a high-flux neutron source selected from the group consisting of plutonium-beryllium, americium-beryllium, americium-lithium, and combinations thereof.

28. The method of claim 1, wherein the ionizing radiation is emitted from a high-flux neutron source comprising an accelerator based neutron generator.

29. The method of claim 1, wherein the sealant composition comprises a radiocatalytic material.

30. The method of claim 29, wherein subjecting the radiocatalytic material increases the radiolysis of water upon exposure to ionizing radiation and produces radiolysis products such as hydroxyl radicals and solvated electrons.

31. The method of claim 30, wherein the radiolysis products induce polymeric radicals to form within the polymeric additive that combine through crosslinking to produce a gelation of the polymer chains.

32. The method of claim 29, wherein the radiocatalytic material comprises at least one metal oxide.

33. The method of claim 29, wherein the radiocatalytic material is selected from the group consisting of $TiO_2$, $SiO_2$, $AlO_2$, $CeO_2$, $ZeO_2$, BeO, and combinations thereof.

34. The method of claim 1, wherein the sealant composition comprises a radiocatalytic material and a sensitizer material.

35. The method of claim 34, wherein the sealant composition comprises a radiocatalytic material, a sensitizer material, and one or more metal oxide.

36. The method of claim 34, wherein the sealant composition comprises: at least one radiocatalytic material selected from the group consisting of $TiO_2$, $SiO_2$, $AlO_2$, $CeO_2$, $ZeO_2$, BeO, and combinations thereof; at least one sensitizer material comprising at least one stannous salt; and at least one metal oxide selected from the group consisting of $Al_2O_3$, $CeO_2$, ZnO, BeO, NiO, $SiO_2$, and combinations thereof.

37. The method of claim 1, wherein the sealant composition comprises a sensitizer material.

38. The method of claim 37, wherein the sensitizer material can catalyze crosslinking of the polymeric additive under ionizing radiation conditions.

39. The method of claim 37, wherein the sensitizer material comprises at least one stannous salt.

40. The method of claim 37, wherein the sensitizer material is selected from the group consisting of stannous chloride, stannous sulfate, and combinations thereof.

41. The method of claim 37, wherein the sealant composition comprises a sensitizer material and one or more metal oxide.

42. The method of claim 41, wherein the one or more metal oxide is selected from the group consisting of $Al_2O_3$, $CeO_2$, ZnO, BeO, NiO, $SiO_2$, and combinations thereof.

43. The method of claim 1, wherein the sealant composition further comprises one or more ethyleneically unsaturated monomer that is polymerizable by ionizing radiation.

44. The method of claim 43, wherein the one or more ethyleneically unsaturated monomer can be any monomer containing one or more $CH_2$=C<group, which are polymerizable by ionizing radiation.

45. The method of claim 43, wherein the one or more ethyleneically unsaturated monomer is selected from the group consisting of vinyl monomers, unsaturated esters of organic acids, unsaturated acids, unsaturated amides, and combinations thereof.

46. The method of claim 43, wherein the one or more ethyleneically unsaturated monomer is selected from the group consisting of n-vinyl-2-pyrrolidone, 2-hydroxyethyl acrylate, 2-hydroxyethyl methacrylate, acrylic acid, methacrylic acid, acrylamide, methacrylamide, and combinations thereof.

47. The method of claim 1, wherein the sealant composition comprises an oxygen scavenger or antioxidant.

48. The method of claim 47, wherein the oxygen scavenger is selected from the group consisting of stannous salts, tetrakis (hydroxymethyl)phosphonium chloride, tetrakis (hydroxymethyl)phosphonium sulfate, sodium formaldehyde sulfoxylate, thiourea dioxide, sodium diothionite, sodium hydroxymethanesulfinate hydrate, sodium hydrosulfite (sodium dithionite), formamidinesulfinic acid (thiourea dioxide), and combinations thereof.

49. The method of claim 1, wherein the wellbore comprises cement particles therein and, wherein the polymeric additive contains at least one functional group which can bond to the surface of cement particles, and a second functional group which is water soluble and can form crosslinks when exposed to the ionizing radiation.

50. The method of claim 1, wherein the sealant composition further comprises photocatalytic particles capable of enhancing degradation of the polymeric component upon exposure to the ionizing radiation.

51. The method of claim 50, wherein the photocatalytic particles are selected from the group consisting of $TiO_2$, doped $TiO_2$, and combinations thereof.

52. The method of claim 1, further comprising a bridging agent capable of reacting with the polymeric additive.

53. The method of claim 52, wherein the bridging agent is selected from the group consisting of ethylene glycol, propylene glycol, diethylene glycol, poly vinyl pyrrolidone, poly vinyl alcohol, poly vinyl methyl ether, poly acryl amide, polyols (alcohols containing multiple hydroxyl functional groups), polyacrylates, and combinations thereof.

54. The method of claim 1, further comprising a multifunctional crosslinker.

55. The method of claim 54, wherein the multifunctional crosslinker is selected from the group consisting of poly (ethylene glycol) diacrylates, poly(ethylene glycol) dimethacrylates, trimethylolpropane triacrylate (TMPTA), ethoxylated TMPTA, trimethylolpropane trimethacrylate, trimethylolpropanetriacrylate, hexanediol diacrylate, N,N-methylene bisacrylamide, hexanedioldivinylether, triethyleneglycol diacrylate, pentaeritritoltriacrylate, tripropyleneglycol diacrylate, 1,3,5-Triallyl-1,3,5-triazine-2,4,6(1H,3H,5H)-trione, 2,4,6 Triallyloxy-1,3,5-triazine, alkoxylated bisphenol A diacrylate, and combinations thereof.

* * * * *